(12) United States Patent
Waldron et al.

(10) Patent No.: US 10,516,917 B2
(45) Date of Patent: Dec. 24, 2019

(54) PROVIDING A PERSONALIZED ENTERTAINMENT NETWORK

(71) Applicant: Turner Broadcasting System, Inc., Atlanta, GA (US)

(72) Inventors: Chris Waldron, Stone Mountain, GA (US); Beau Teague, Marietta, GA (US); Sherri Glass, Atlanta, GA (US); Robert Sorcher, Los Angeles, CA (US); Justin Smith, Marietta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 15/066,070

(22) Filed: Mar. 10, 2016

(65) Prior Publication Data

US 2016/0269781 A1   Sep. 15, 2016

Related U.S. Application Data

(60) Provisional application No. 62/130,866, filed on Mar. 10, 2015.

(51) Int. Cl.
| | |
|---|---|
| *H04N 21/462* | (2011.01) |
| *H04N 21/45* | (2011.01) |
| *H04N 21/482* | (2011.01) |
| *H04N 21/258* | (2011.01) |
| *H04N 21/658* | (2011.01) |

(Continued)

(52) U.S. Cl.
CPC ....... *H04N 21/462* (2013.01); *H04N 21/4532* (2013.01); *H04N 21/482* (2013.01); *H04N 21/25883* (2013.01)

(58) Field of Classification Search
CPC combination set(s) only.
See application file for complete search history.

(56) References Cited

U.S. PATENT DOCUMENTS

| | | |
|---|---|---|
| 5,002,503 A | 3/1991 | Campbell et al. |
| 5,388,202 A | 2/1995 | Squires et al. |

(Continued)

OTHER PUBLICATIONS

Sharma, Amol, "Viacom to Launch Customized Kids' TV Channel", *The Wall Street Journal*, Jan. 14, 2014, 5 pages, retrieved from <http://www.wsj.com/articles/SB10001424052702303754404579312904182126302> on Sep. 20, 2016.

*Primary Examiner* — Alexander Gee
(74) *Attorney, Agent, or Firm* — Alston & Bird LLP

(57) ABSTRACT

Methods, apparatus, computer program products, and systems for providing a personalized entertainment network are provided. An example method comprises (a) establishing a communication session with an application executing on a user device; (b) receiving network identifying information identifying a personalized network; (c) determining an ordered set of media item identifiers; and (d) providing one or more digital media items in accordance with the ordered set of media item identifiers. Each media item identifier is configured to identify a digital media item. Determining the ordered set of digital media items comprises assigning a class to each position of the ordered set and assigning a media item identifier to each position of the ordered set. A particular digital media item identified by a particular media item identifier assigned to a particular position of the ordered set corresponds to the class assigned to that particular position.

20 Claims, 23 Drawing Sheets

(51) Int. Cl.
    *H04N 21/475*    (2011.01)
    *H04N 21/262*    (2011.01)

(56) References Cited

U.S. PATENT DOCUMENTS

| | | |
|---|---|---|
| 5,519,790 A | 5/1996 | Manning |
| 5,923,642 A | 7/1999 | Young |
| 6,011,950 A | 1/2000 | Young |
| 6,622,148 B1 | 9/2003 | Noble et al. |
| 6,933,433 B1 | 8/2005 | Porteus et al. |
| 8,571,935 B2 | 10/2013 | Geer, III et al. |
| 8,571,936 B2 | 10/2013 | Geer, III et al. |
| 8,752,083 B2 | 6/2014 | Geer, III et al. |
| 8,850,504 B2 | 9/2014 | Riedel |
| 8,929,718 B2 | 1/2015 | Griffin et al. |
| 9,246,965 B1 * | 1/2016 | Stoica ............... H04L 65/80 |
| 2006/0174264 A1 * | 8/2006 | Candelore ........... H04N 5/4401 725/34 |
| 2006/0212367 A1 * | 9/2006 | Gross ............... G06Q 30/06 705/26.1 |
| 2006/0212444 A1 * | 9/2006 | Handman ........... G06Q 30/02 |
| 2007/0204308 A1 * | 8/2007 | Nicholas ........... H04N 7/17318 725/86 |
| 2007/0233551 A1 * | 10/2007 | Levy ............... G06Q 10/06395 705/347 |
| 2009/0165044 A1 * | 6/2009 | Collet ............... H04N 5/44543 725/38 |
| 2010/0146559 A1 * | 6/2010 | Lee ............... H04L 12/1822 725/61 |
| 2011/0112914 A1 | 5/2011 | Geer, III et al. |
| 2011/0112915 A1 | 5/2011 | Geer, III et al. |
| 2011/0219084 A1 | 9/2011 | Borra et al. |
| 2012/0096011 A1 | 4/2012 | Kay et al. |
| 2012/0150662 A1 | 6/2012 | Hannon et al. |
| 2012/0158524 A1 | 6/2012 | Hintz et al. |
| 2012/0172132 A1 | 7/2012 | Molyneaux et al. |
| 2012/0215646 A1 | 8/2012 | Geer, III et al. |
| 2012/0215879 A1 | 8/2012 | Bozo |
| 2012/0222064 A1 | 8/2012 | Geer, III et al. |
| 2012/0239510 A1 | 9/2012 | Geer, III et al. |
| 2012/0240098 A1 | 9/2012 | Souza et al. |
| 2012/0246009 A1 | 9/2012 | Hafez et al. |
| 2012/0246588 A1 | 9/2012 | Petersen et al. |
| 2013/0031636 A1 | 1/2013 | Altschul et al. |
| 2013/0064524 A1 | 3/2013 | Griffin et al. |
| 2013/0086609 A1 | 4/2013 | Levy et al. |
| 2013/0263000 A1 | 10/2013 | Lucas et al. |
| 2013/0347018 A1 * | 12/2013 | Limp ............... H04N 21/4826 725/19 |
| 2014/0002460 A1 | 1/2014 | Riedel et al. |
| 2014/0006156 A1 | 1/2014 | Theophilis |
| 2014/0079371 A1 | 3/2014 | Tang et al. |
| 2014/0082684 A1 | 3/2014 | Frey et al. |
| 2014/0095692 A1 | 4/2014 | Anderson et al. |
| 2014/0365598 A1 | 12/2014 | Torpey |
| 2015/0020106 A1 * | 1/2015 | Belyaev ............ H04N 21/4622 725/45 |
| 2015/0120768 A1 * | 4/2015 | Wellen ............... G06F 17/20 707/755 |
| 2015/0237384 A1 * | 8/2015 | Ruffini ............ H04N 21/23106 725/92 |
| 2015/0365725 A1 * | 12/2015 | Belyaev ............ H04N 21/458 725/46 |

\* cited by examiner

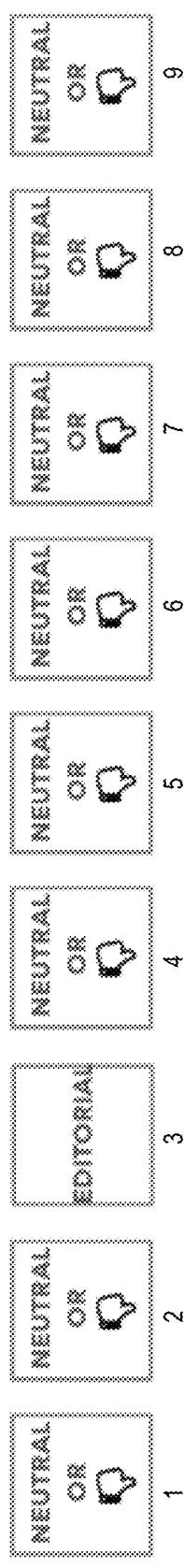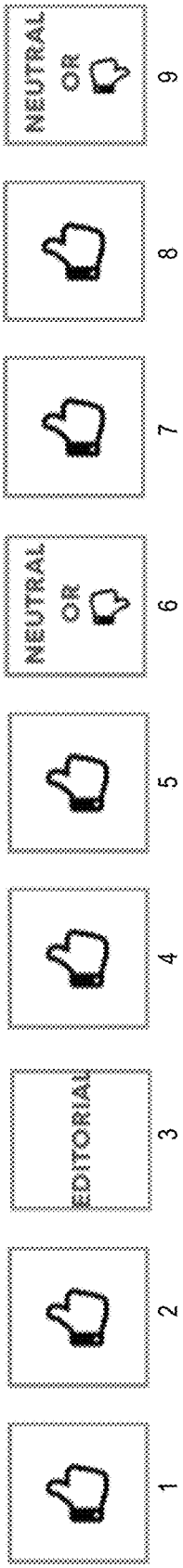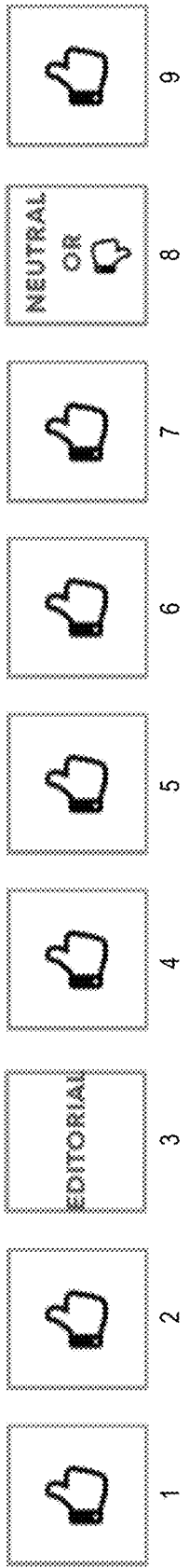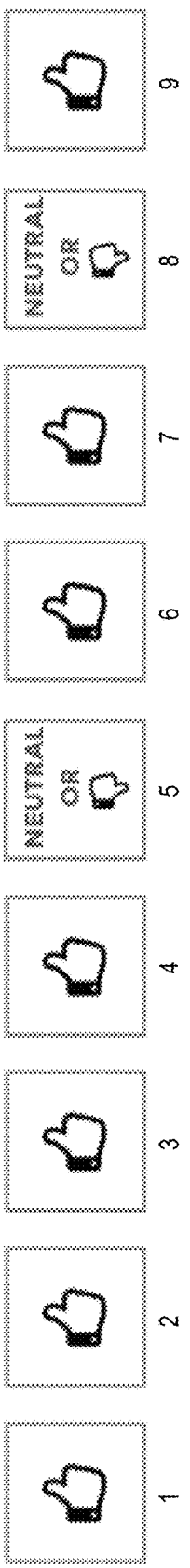

PROVIDING A PERSONALIZED ENTERTAINMENT NETWORK

CROSS-REFERENCE TO RELATED APPLICATIONS

This patent application is claims priority to provisional U.S. Patent Application Ser. No. 62/130,866, filed Mar. 10, 2015, which is incorporated herein by reference in its entirety.

TECHNOLOGICAL FIELD

Embodiments of the present invention are generally related to producing and providing users with a personalized entertainment network.

BACKGROUND

The majority of users receive and experience media presentations via live linear broadcast television, live broadcast radio, printed publications (e.g., newspapers, magazines, books, etc.), and/or other non-interactive media presentations. However, the Internet and related technologies allow users to access media presentations via video-on-demand (VOD), podcasts, Internet publications, and/or the like. As a result, new behaviors have emerged regarding, for example, control, ubiquity, and personalization of media presentations that have profoundly changed the way users want, need, and expect to experience media presentations.

Therefore, a need exists for improved methods, apparatus, systems, computer program products, computing devices, computing entities, and/or the like for producing and/or providing users with personalized entertainment networks.

BRIEF SUMMARY

In general, embodiments of the present invention provide methods, apparatus, systems, computer program products, computing devices, computing entities, and/or the like for producing and providing one or more users with a personalized entertainment network for viewing one or more digital media items.

According to an aspect of the present invention, a method for providing a personalized entertainment network is provided. In one embodiment, the method comprises establishing, by a provider system comprising one or more processors, a communication session with an application that is (a) executed on a user computing device and (b) provides a user interface for user interaction. The method further comprises receiving network identifying information identifying a personalized network; determining an ordered set of media item identifiers based at least in part on network profile information for the personalized network identified by the network identifying information, wherein each media item identifier is configured to identify a digital media item; and providing one or more digital media items for display by the user interface in accordance with the ordered set of media item identifiers. Determining the ordered set of digital media items comprises assigning a class to each position of the ordered set and assigning a media item identifier to each position of the ordered set. The particular digital media item identified by a particular media item identifier assigned to a particular position of the ordered set corresponds to the class assigned to that particular position.

According to another aspect of the present invention, an apparatus is provided. In one embodiment, the apparatus comprises at least one processor and at least one memory including program code. The at least one memory and the program code configured to, with the processor, cause the apparatus to at least establish a communication session with an application that is (a) executed on a user computing device and (b) provides a user interface for user interaction. The at least one memory and the program code are further configured to, with the processor, cause the apparatus to at least receive network identifying information identifying a personalized network; determine an ordered set of media item identifiers based at least in part on network profile information for the personalized network identified by the network identifying information, wherein each media item identifier is configured to identify a digital media item; and provide one or more digital media items for display by the user interface in accordance with the ordered set of media item identifiers. To determine the ordered set of digital media items the at least one memory and the program code are configured to, with the processor, cause the apparatus to assign a class to each position of the ordered set and assign a media item identifier to each position of the ordered set. A particular digital media item identified by a particular media item identifier assigned to a particular position of the ordered set corresponds to the class assigned to that particular position.

According to yet another aspect of the present invention, a computer program product is provided. In one embodiment, the computer program product comprises at least one non-transitory computer-readable storage medium having computer-readable program code portions stored therein. The computer-readable program code portions comprising an executable portion configured to establish a communication session with an application that is (a) executed on a user computing device and (b) provides a user interface for user interaction. The computer-readable program code portions further comprise an executable portion configured to receive network identifying information identifying a personalized network; an executable portion configured to determine an ordered set of media item identifiers based at least in part on network profile information for the personalized network identified by the network identifying information, wherein each media item identifier is configured to identify a digital media item; and an executable portion configured to provide one or more digital media items for display by the user interface in accordance with the ordered set of media item identifiers. Determining the ordered set of digital media items comprises assigning a class to each position of the ordered set, and assigning a media item identifier to each position of the ordered set. A particular digital media item identified by a particular media item identifier assigned to a particular position of the ordered set corresponds to the class assigned to that particular position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 21:
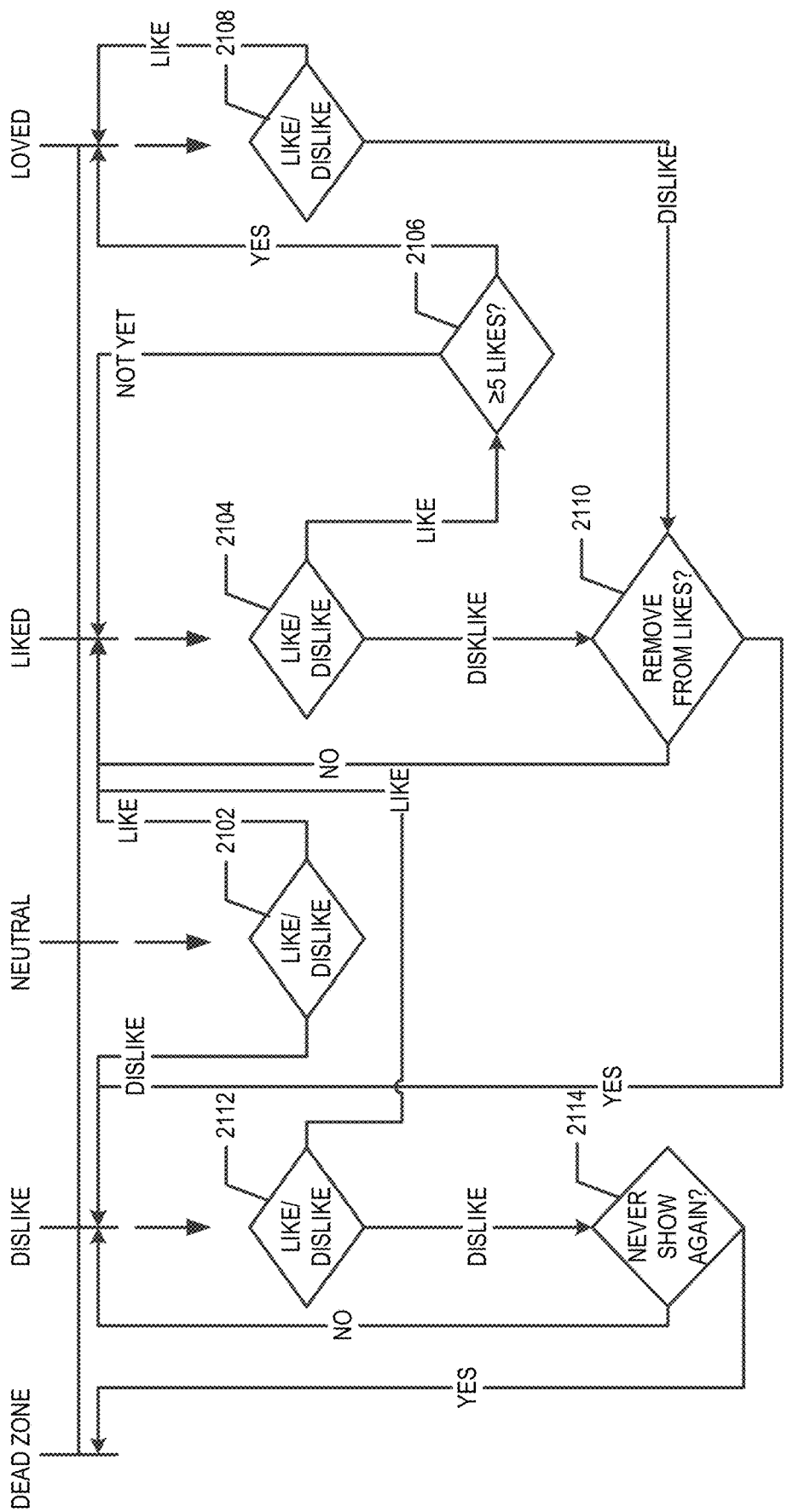

FIGS. 4, 6, 10, 13, 14, 17, 19, and 22 provide flowcharts illustrating various processes, procedures, and/or operations for providing a personalized entertainment network, in accordance with various embodiments of the present invention;

FIGS. 5, 8, 9, 11A, 11B, 12, 15, 16, and 20 illustrate example screenshots or mockups of a user interface provided in accordance with various embodiments of the present invention;

FIGS. 7A, 7B, 7C, 7D, and 18 diagram various steps in building a personalized entertainment network, in accordance with an embodiment of the present invention; and FIG. 21 illustrates an example class status evolution flow, in accordance with an embodiment of the present invention.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

I. Methods, Apparatus, Systems, and Computer Program Products

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention provide methods, apparatus, systems, computer program products, computing devices, computing entities, and/or the like for providing users with a personalized entertainment network for viewing one or more digital media items. The disclosure provided herein relates to a wide variety of audio and/or visual digital media items (e.g., movies; television shows; cartoons; clips of television shows, movies, or cartoons; shorts; interactive media (e.g., games); trailers for movies, television shows, cartoons, games, and/or the like; and/or the like). As will be recognized, such concepts can be applied to a variety of formats and environments. In various embodiments, each digital media item may be associated with a class, a type, and/or other metadata (e.g., length of the media item, title of the media item, a new item indicator, and/or the like). For example, a class may be a television show, cartoon program, affiliated group of characters, or other collection of media items. A media item may be an episode, clip, or short associated with the television show, cartoon program and/or the like. The type associated with the media item may indicate whether the media item is an episode, clip, short, and/or other type of media item. Various metadata may be associated with a digital media item, including a media item identifier, a file format, encryption information/data, length of the media item, title of the media item, a date and/or time the media item was added to the catalog of media items, and/or the like.

In various embodiments, a personalized entertainment network may provide one or more media items to a user via live, on demand programming, or through a personalized live feed. For example, a personalized entertainment network may be a personalized linear broadcast feed of digital media items. In various embodiments, the personalized entertainment network may provide one or more digital media items to a user via a personalized entertainment network, as will be discussed in more detail herein. As will be recognized, various system architectures that may be used in accordance with the present invention will now be described herein.

III. Exemplary System Architecture

Figure 1:
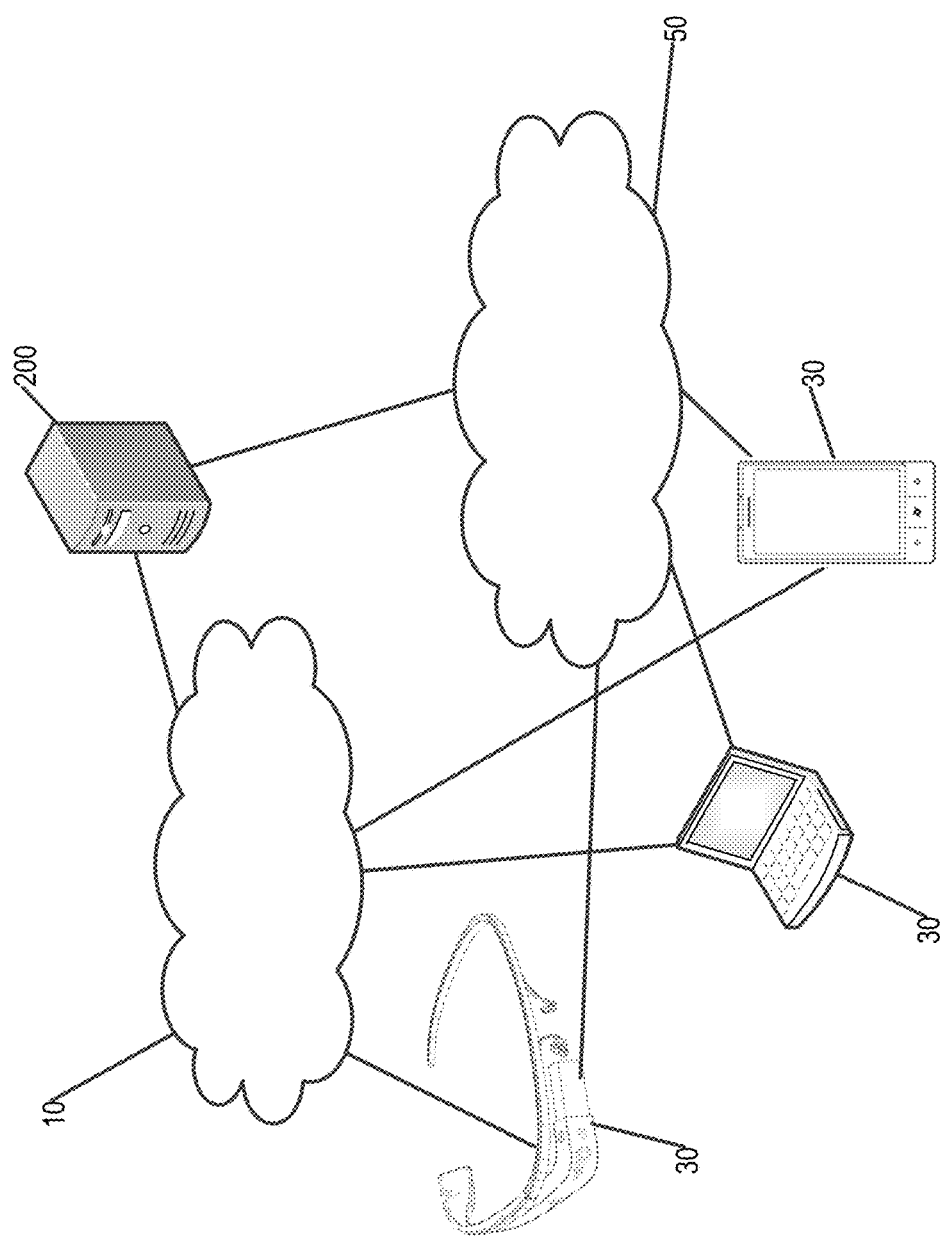
FIG. 1 illustrates one embodiment of a system for producing and providing a user with personalized entertainment network, in accordance with one embodiment the present invention.

FIG. 1 illustrates one embodiment of a system that may implement the present invention. In this particular embodiment, the illustrated system may include one or more content distribution/delivery networks (CDNs) 10, one or more user computing entities 30, and one or more provider networks/systems 200. The one or more CDNs 10, the one or more user computing entities 30, and the one or more provider networks/systems 200 may communicate with each other and/or a variety of other computing entities via one or more wired or wireless networks. Although described separately, it will be recognized that two or more of the above entities can be combined or included in a single platform.

Content Distribution/Delivery Networks 10

In various embodiments, the one or more CDNs 10 may comprise networks configured for distributing media content. Generally, the term "content," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 10 may be configured for providing a user with media content via a broadcast, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

Over-the-Air Content Delivery/Distribution Network

An over-the-air (OTA) CDN 10 can be used in conjunction with embodiments of the present invention. The OTA CDN 10 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City-Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA CDNs 10 depending on the geographic area (e.g., DMA, zip code, block group, census tract, cartographic level, government-established area/zone, geographic area, and/or the like) the broadcast area includes.

An OTA CDN 10 may include various components to transmit/broadcast content and/or data/information via an OTA broadcast (e.g., an OTA broadcast signal) to be received by one or more distribution devices 105. In one embodiment, the OTA CDN 10 may include one or more channel coding elements, one or more modulation elements, and one or more transmitters. Although not shown, the OTA CDN 10 may also include various other components, such as audio subsystems, video subsystems, multiplexers, exciters, drivers, amplifiers, network interfaces, processing elements, and/or the like. Via these elements, for instance, the OTA CDN 10 can transmit/broadcast OTA broadcasts (comprising content and/or data) within a broadcast area. The OTA CDN 10 may transmit/broadcast the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting—Terrestrial (DVB-T), Digital Video Broadcasting—Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

It will be appreciated that one or more of a CDN's 10 components and other broadcaster components may be located remotely from one another. Furthermore, one or more of the components may be combined and additional components performing functions described herein may be included.

Cable Content Delivery/Distribution Network

Although not shown, a cable CDN 10 (also referred to as a CDN 10) may be used with embodiments of the present invention. A cable CDN 10 may include various components to transmit/broadcast content and/or data/information via the cable provider's CDN 10 to the cable provider's subscribers. For example, in various embodiments, the cable CDN 10 may include a network operations center, a cable modem termination system, and a headend to transmit cable broadcasts (e.g., digital cable signals) through the cable provider's CDN 10 to user computing entities 30. Thus, user computing entities 30 may communicate with a headend over a distribution network.

To perform such functions, the cable CDN 10 may include various components, such as audio subsystems, video subsystems, multiplexers, switches, encoders, satellite receivers and antennae, network interfaces, decoding elements, encoding elements, processing elements, transmitting elements, modulation elements, and/or the like. The cable CDN 10 may be capable of receiving content and/or data/information and/or transmitting content and/or data/information (e.g., transmit broadcast signals in a one-to-many or broadcast configuration) using a variety of standards and protocols to user computing entities 30, including those described with regard to the OTA CDN 10 and/or further including various versions of data/information over cable service interface specification (DOCSIS).

Satellite Content Delivery/Distribution Network

Although not shown, a satellite CDN 10 (also referred to as a CDN 10) may be used with embodiments of the present invention. A satellite CDN 10 may include various components to transmit/broadcast content and/or data/information (e.g., transmit broadcast signals in a one-to-many or broadcast configuration) via the satellite provider's CDN 10 to user computing entities 30 (e.g., subscribers). For example, in various embodiments, the satellite CDN 10 may include uplink facilities (with transmitting antennae), satellites (with transponders), receiving satellite dishes, and/or user computing entities 30. Thus, the satellite CDN 10 can transmit/broadcast satellite broadcasts (comprising content and/or data) to user computing entities 30 using a variety of standards and protocols, such as those described with regard to the OTA CDN 10 and/or further including direct broadcast satellite (DBS), television receive only (TVRO), and/or the like.

IP-Based Delivery/Distribution Network

Although not shown, an IP-based CDN 10 (also referred to as a CDN 10) may be used with embodiments of the present invention. An IP-based CDN 10 may include various components to transmit/broadcast content and/or data/information (e.g., transmit broadcast signals in a one-to-many or broadcast configuration) via the provider's CDN 10 to user computing entities 30 (e.g., subscribers). Thus, the IP-based CDN 10 can transmit/broadcast broadcasts (comprising content and/or data) to user computing entities 30 using a variety of standards and protocols, such as those described previously.

As described above, CDNs 10 may involve one or more of the above-described types of CDN networks—e.g., OTA networks, satellite networks, cable networks, IP-based networks, other networks, and/or combinations thereof.

Provider System 200

The term "provider" is used to indicate any entity, individual, organization, company, group and/or the like that provides or assists in providing one or more users with at least one media item. The term "user" is used herein to indicate any individual, family, entity, organization, company, group, and/or the like that accesses, receives, views, and/or experiences at least one media item provided by the provider. In some embodiments, the user may access, receive, view, and/or experience at least one media item from the provider via a paid or unpaid subscription service for example.

In various embodiments, a provider system 200 may be configured to provide a user (e.g., operating a user computing entity 30) one or more digital media items. For example, the provider system may determine a personalized entertainment network and provide one or more media items of the personalized entertainment network to the user (e.g., via the user computing entity 30). The provider system 200 may be further configured to receive media item selection, user feedback, and/or other information/data for dynamically updating a personalized entertainment network. The one or more media items may be in the form of a live stream of the media items, an on demand stream of the media presentations (e.g., Video on Demand (VOD) and/or the like), and/or the like.

In various embodiments, the provider system 200 can be a system operated by, on behalf of, or in association with a media item provider to provide a personalized entertainment network to one or more users. In general, the terms computing entity, network, network entity, entity, device, system, server, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data/information, content, information, and/or similar terms used herein interchangeably.

Figure 2:
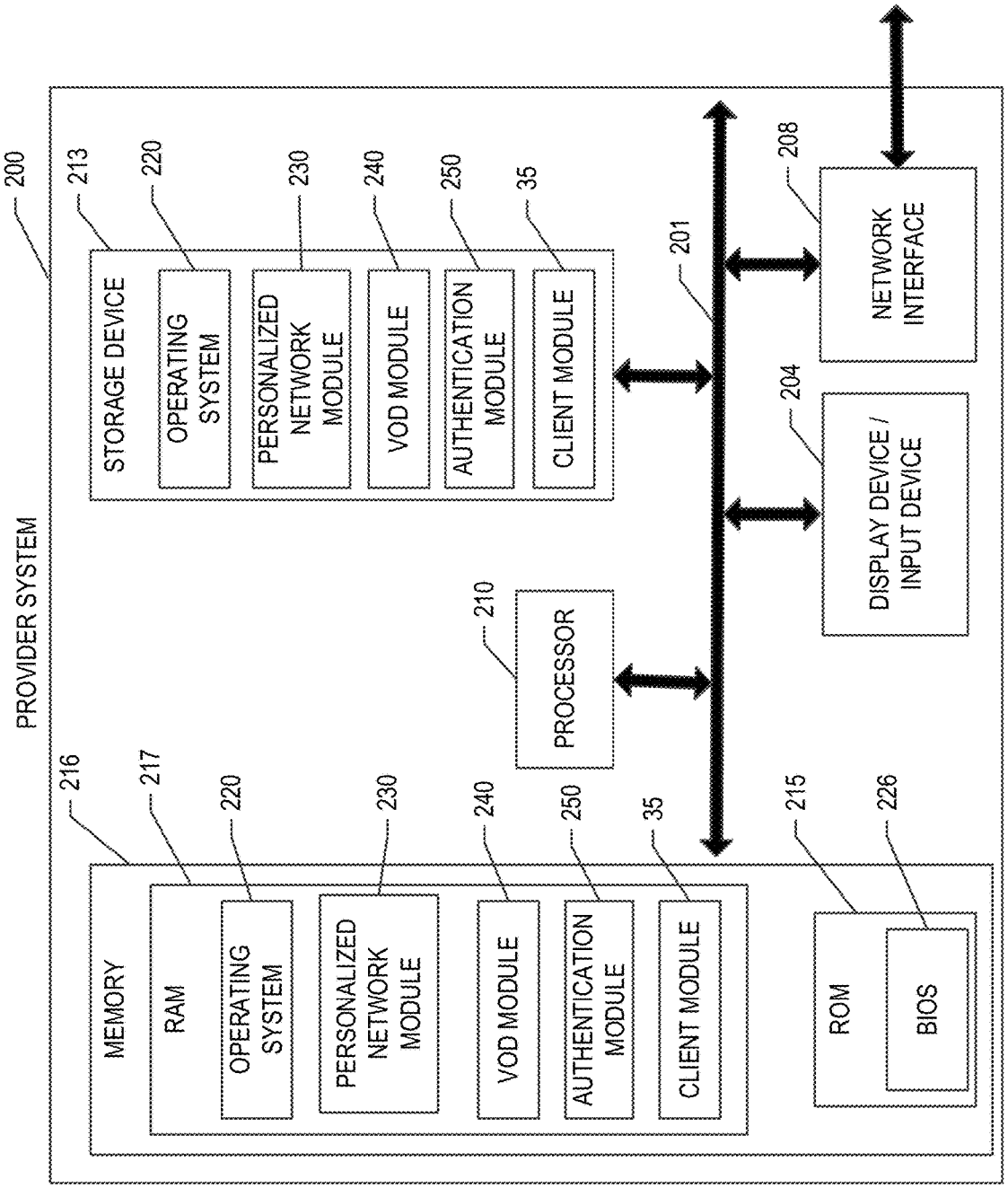
FIG. 2 is a schematic diagram of a provider system, in accordance with an embodiment of the present invention.

FIG. 2 provides a schematic diagram of an example provider system 200. The provider system 200 comprises a processor 210, such as one or more processing elements, which may include complex programmable logic devices (CPLDs), microprocessors, multi-core processors, coprocessing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present invention, such as the embodiments illustrated in FIG. 4, when configured accordingly. The processor 210 is used to execute software instructions for carrying out the defined steps of the method of the various embodiments of the present invention. The processor 210 communicates using a data/information bus 201 that is used to convey data/information and program instructions, typically, between the processor and memory 216.

The provider system 200 further includes memory 216, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data/information, applications, programs, program modules, scripts, source code, object code, byte code, compiled code, interpreted code, machine code, executable instructions, and/or the like. Such code may include the personalized entertainment network module 230, VOD module 240, authentication module 250 and/or client module 35. The terms database, database instance, database management system, and/or similar terms used herein interchangeably may refer to a structured collection of records or data/information that is stored in a computer-readable storage medium, such as via a relational database, hierarchical database, and/or network database.

In at least one embodiment, the provider system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data/information, applications, programs, program modules, scripts, source code, object code, byte code, compiled code, interpreted code, machine code, executable instructions, and/or the like being executed by, for example, the processor 210. Thus, the databases, database instances, database management systems, data/information, applications, programs, program modules, scripts, source code, object code, byte code, compiled code, interpreted code, machine code, executable instructions, and/or the like may be used to control certain aspects of the operation of the provider system 200 with the assistance of the processor 210 and operating system 220, personalized entertainment network module 230, VOD module 240, authentication module 250, and/or client module 35.

As indicated, a number of program modules may be stored by the non-volatile (e.g., ROM 215) and/or volatile (e.g., RAM 217) memory. Such program modules may include the personalized entertainment network module 230, VOD module 240, authentication module 250, and/or client module 35. Those skilled in the art will appreciate that other modules may be present in RAM 217 to effectuate the various embodiments of the present invention. Furthermore, rather than described modules, other modules may be used or embodiments may not be modular.

As indicated, in one embodiment, the provider system 200 may also include one or more communications interfaces 208 for communicating with various computing entities, such as by communicating data/information, content, information, and/or similar terms used herein interchangeably that can be transmitted, received, operated on, processed, displayed, stored, and/or the like. For instance, the provider system 200 may be in communication with one or more user computing entities 30 via various wired or wireless network 50. Such communication may be executed using a wired data/information transmission protocol, such as fiber distributed data/information interface (FDDI), digital subscriber line (DSL), Ethernet, asynchronous transfer mode (ATM), frame relay, DOCSIS, Programming Metadata Communication Protocol (PMCP), or any other wired transmission protocol. Similarly, the provider system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, any other wireless protocol, and/or any other appropriate communications protocol. In various embodiments, the provider system 200 may be configured to communicate with various computing entities to provide at least one personalized entertainment network for viewing at least one media presentation to a user computing entity 30.

Various information/data may be input to the provider system 200 via the network interface 208 and/or input/output device 204. This input information/data may include information/data related to a media item, user feedback regarding a particular media item or class of media item, metadata or other data/information associated with a media item, data/information associated with one or more users, or other information. This input information/data may vary, however, depending on the configuration and informational requirements of the provider system 200.

As mentioned above, the provider system 200 also includes an input/output device 204 for receiving and displaying data/information. The provider system 200 may include or be in communication with one or more input elements, such as a keyboard input, a mouse input, a touch screen/display input, audio input, pointing device input, joystick input, keypad input, and/or the like, as indicated by input/output device 204. The provider system 200 may also include or be in communication with one or more output elements, as indicated by input/output device 204, such as audio output, video output, screen/display output, motion output, movement output, and/or the like.

The provider system 200 may be configured to facilitate production of and provide users with a personalized entertainment network for viewing at least one media item. The provider system 200 may further be configured to receive and store profile information/data for each of one or more users, determine one or more personalized entertainment networks, each personalized entertainment network associated with at least one of the one or more users, receive user feedback from at least one of the one or more users regarding one or more media items, update the personalized entertainment network associated with the user based on the user feedback, and provide one or more media items to one or more user computing entities 30 associated with at least one of the users such that the media item may be displayed via a user interface that may be provided by client module 35. The provider system 200 may be further configured to complete processes related to producing the digital media item and/or the like.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the provider system 200 may be located remotely from other provider system 200 components, such as in a distributed system. Furthermore, one or more of the components may be combined and additional components performing functions described herein may be included in the provider system 200. Thus, the provider system 200 can be adapted to accommodate a variety of needs and circumstances.

User Computing Entity 30

In various embodiments, the user computing entity 30 may be configured to receive at least one digital media item and/or data/information associated with at least one personalized entertainment network, provide the user with the at least one digital media item, receive and provide user feedback to the provider system 200, and/or the like. The user computing entity 30 is any system used by a user to receive, view, and/or experience at least one enhanced media presentation. For example, as described above, a user computing entity 30 may be one or more computers, mobile phones, gaming consoles (e.g., Xbox, Play Station, Wii), desktops, tablets, notebooks, phablets, set-top devices in communication with a television or other display device (e.g., projector and/or the like), smart televisions, laptops, wearable computer, and/or any combination of devices or entities adapted to perform the functions, operations, and/or processes described herein. In one embodiment, the user computing entity 30 may comprise a combination of two or more computing devices noted above and/or other computing devices. For example, a user computing entity 30 may comprise a set top box "paired" with a tablet.

In one embodiment, the user computing entity 30 may include one or more components that are functionally similar to those of the provider system 200. In one embodiment, the user computing entity 30 may include one or more processing elements, one or more display device/input devices, volatile and non-volatile storage or memory, and/or one or more communications interfaces. The user computing entity 30 may also comprise various other systems. In particular, the user computing entity 30 may include components configured to receive a digital media item and/or related data/information with audio, visual, and/or other output for experiencing the digital media item, and/or the like. The user computing entity 30 may also be in communication with a variety of computing entities.

In various embodiments, the user computing entity 30 may include or otherwise be in communication with a variety of input devices that may be configured to receive input from a user such that a user may control his/her experience of an enhanced media presentation. For example, in some embodiments, the user computing entity 30 may include or be in communication with a pointing device such as a computer mouse, infrared pointing device, motion detecting device, and/or the like. In other embodiments, the user computing entity 30 may include or be in communication with a joy stick, remote control, handheld controller which may include a d-pad, and/or the like. Thus, the user computing entity 30 may be configured to receive user input through a variety of input approaches and techniques.

Figure 3:
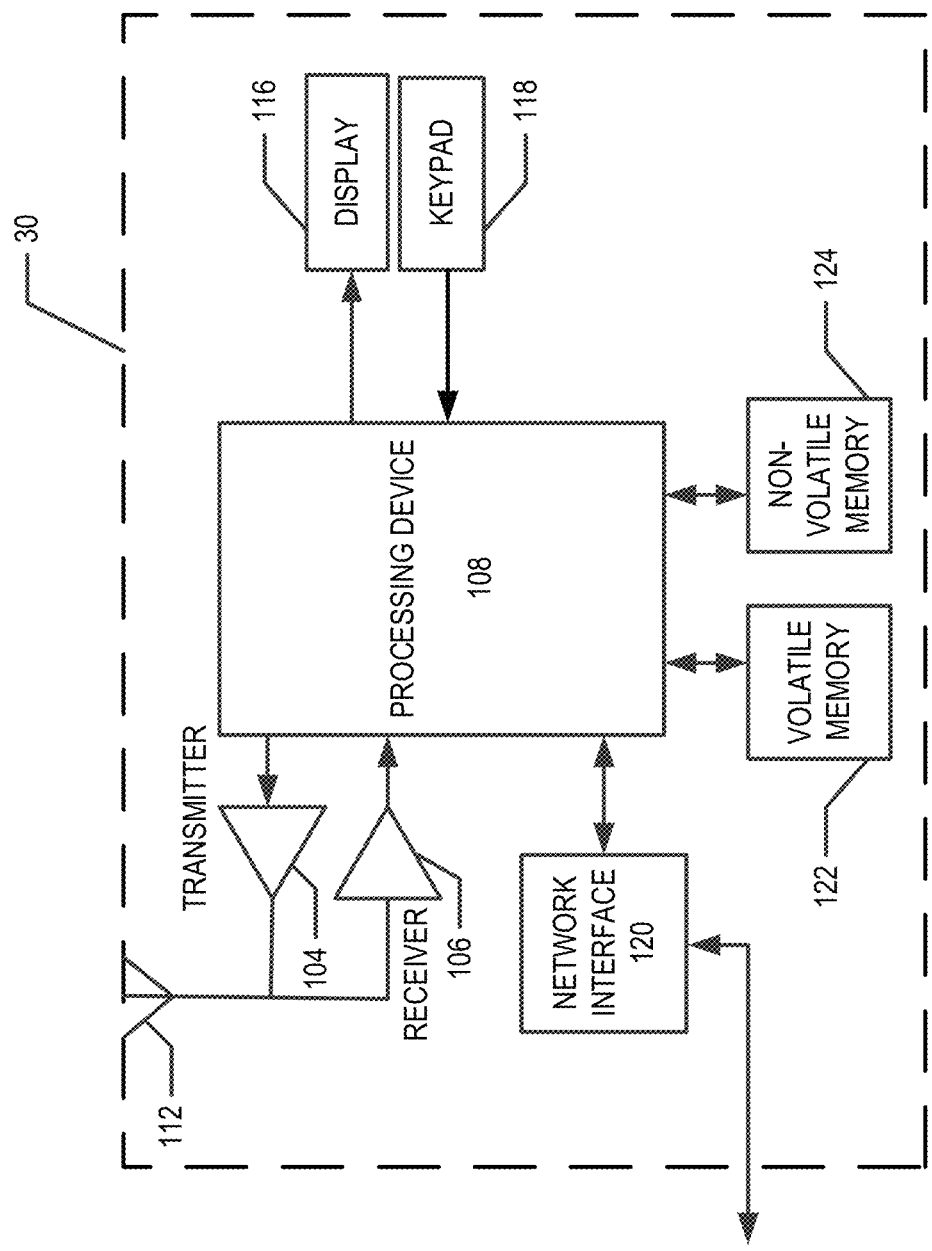
FIG. 3 is a schematic diagram of a user computing entity, in accordance with an embodiment of the present invention.

FIG. 3 provides an illustrative schematic representative of an example user computing entity 30 that can be used in conjunction with embodiments of the present invention. As shown in FIG. 3, the user computing entity 30 can include an antenna 112, a transmitter 104 (e.g., radio), a receiver 106 (e.g., radio), and a processing element 108 (e.g., CPLDs, microprocessors, multi-core processors, coprocessing entities, ASIPs, microcontrollers, and/or controllers) that provides signals to and receives signals from the transmitter 104 and receiver 106, respectively.

The signals provided to and received from the transmitter 104 and the receiver 106, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the provider system 200. In a particular embodiment, the user computing entity 30 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, Bluetooth low energy (BLE), ZigBee, near field communication (NFC), infrared (IR), ultra-wideband (UWB), and/or the like. Similarly, the user computing entity 30 may operate in accordance with multiple wired communication standards and protocols, such as those described above with regard to the provider system via a network interface 120.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 30 position in connection with a variety of other systems, including wireless towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, wireless towers, nearby computing devices (e.g., smartphones, laptops) and/or the like. For instance, such technologies may include the iBeacons, Gimbal proximity beacons, Bluetooth Low Energy (BLE) transmitters, NFC transmitters, infrared transmitters, ZigBee transmitters, ultra-wideband transmitters, and/or the like. These indoor positioning aspects can be used in a variety of settings to determine the location of someone or something to within inches or centimeters.

The user computing entity 30 may also comprise a user interface (that can include a display 116 coupled to a processing element 108) and/or a user input interface (coupled to a processing element 108). For example, the user interface may be a user application, browser, user interface, and/or similar words used herein interchangeably executing on and/or accessible via the user computing entity 30 to interact with and/or cause display of information/data from the provider system 200, as described herein. The user input interface can comprise any of a number of devices or interfaces allowing the user computing entity 30 to receive data, such as a keypad 118 (hard or soft), a touch display, voice/speech or motion interfaces, or other input device. In embodiments including a keypad 118, the keypad 118 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 30 can also include volatile storage or memory 122 and/or non-volatile storage or memory 124, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the provider system 200, and/or various other computing entities.

In another embodiment, the user computing entity 30 may include one or more components or functionality that are the same or similar to those of the provider system 200, as described in greater detail above. As will be recognized, these architectures and descriptions are provided for exemplary purposes only and are not limiting to the various embodiments.

IV. Exemplary System Operation

Various embodiments of the present invention are configured to provide one or more personalized entertainment networks to one or more users and to provide one or more digital media items to one or more users in accordance with a corresponding personalized entertainment network. In example embodiments, a personalized entertainment network may comprise an ordered set of digital media items and/or media item identifiers, wherein each media item identifier is configured to uniquely identify a digital media item. Each digital media item and/or media item identifier of the personalized entertainment network may be associated with a cardinality index indicating the position of the digital media item and/or the media item identifier within the ordered set. Digital media items may be provided by and/or through the personalized entertainment network in the order indicated by the ordered set and the corresponding cardinality indexes (e.g., the media item assigned to position 2 is provided following the media index assigned to position 1). Each digital media item is associated with a class, a type, a media item identifier, metadata, and/or the like. A media item that is new (e.g., became available within the last 24 hours, last few days, last week, and/or the like) may be associated with a new item indicator configured to indicate that the item is new. A class may have a number of digital media items of various types associated therewith. For example, a class may be a television show, cartoon program, set of affiliated characters, and/or other collection of digital media items, and the associated media items may be episodes, clips, shorts, games, interactive media, and/or the like associated with the class of items. In general, clips are editorially selected excerpts from existing full episodes and shorts are unique, non-traditional-length full episodes.

In an embodiment, each personalized entertainment network may correspond to a network profile. The network profile may comprise a class status for each class. A class status may indicate whether and/or how much the user to whom the personalized entertainment network is provided likes or dislikes the corresponding class. For example, the class status may indicate the degree with which the user likes or dislikes a class. For example, a user may love, like, be neutral, dislike, or hate a particular class of media items in an example embodiment. The class status associated with each class may be used to build, rebuild, update, and/or refresh a personalized entertainment network, as described in more detail below. The network profile may further comprise a network identifier configured to identify a personalized entertainment network, a list of media items already provided through the personalized entertainment network, personalized entertainment network preferences and/or settings, and/or the like. In various embodiments, a network profile may comprise an array and/or the like comprising the ordered set comprising the personalized entertainment network.

In some embodiments, a network profile may be associated with a user profile. In various embodiments, as indicated, the user profile may correspond to an individual user, a family, a household, a group, and/or the like. In an example, embodiment, a user profile may be associated with one or more network profiles. In various embodiments, a user profile may comprise authorizing information/data related to a subscription service, and/or the like. The user profile may comprise demographic information/data corresponding to the user(s) corresponding to the user profile, and/or the like. Various aspects of providing a personalized entertainment network will now be described in greater detail.

Providing a Digital Media Item Through a Personalized Network

Figure 4:
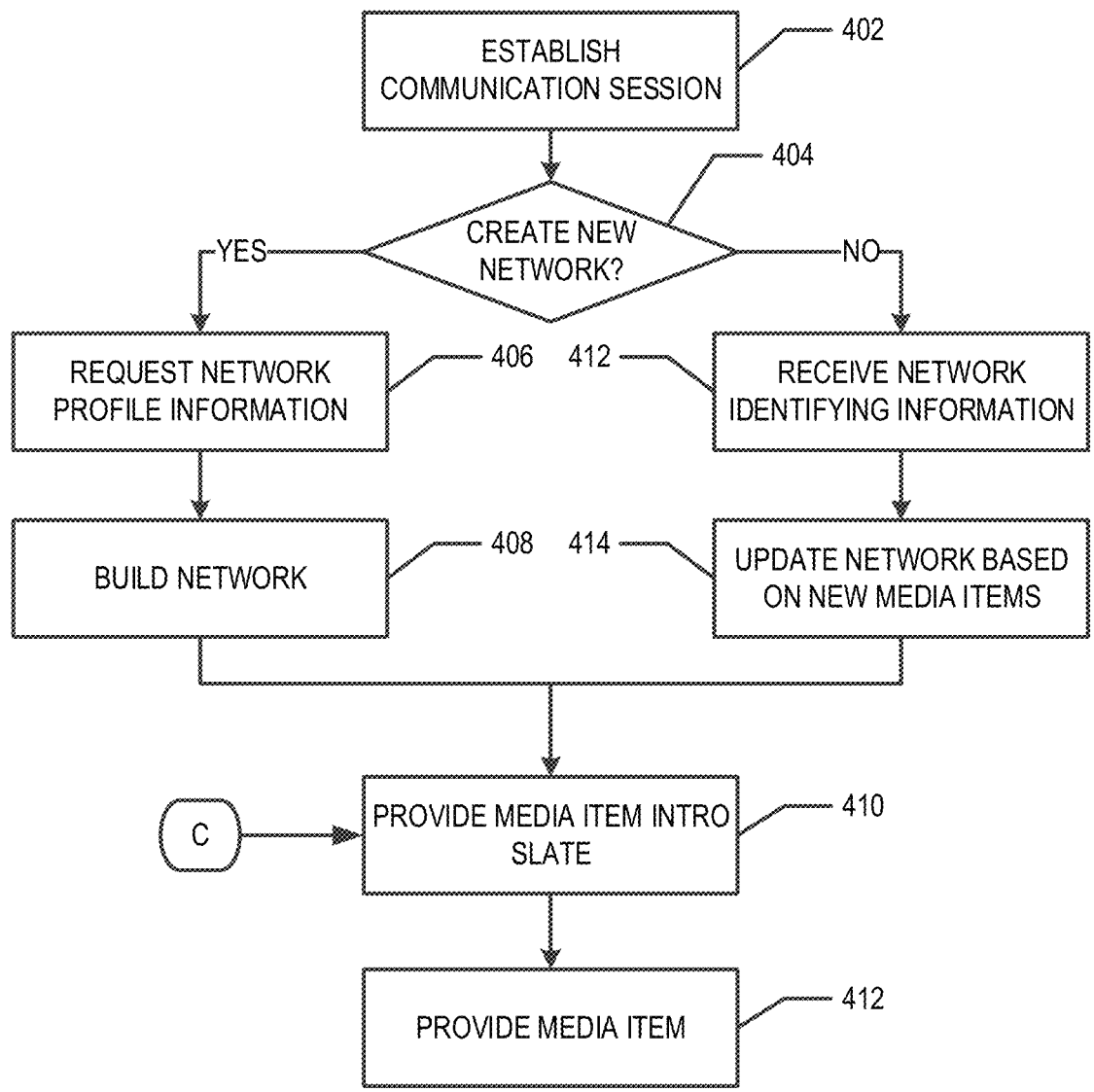

FIG. 4 provides a flowchart illustrating processes and procedures for providing a digital media item to a user (e.g., operating a user computing entity 30) in accordance with a corresponding personalized entertainment network. Starting at step/operation 402, a communication session between a user computing entity 30, the provider system 200, the CDN 10, and/or the like may be established. For example, a user (e.g., operating a user computing entity 30) may open a client module 35 operating on the user computing entity 30, access a personalized entertainment network user interface through a browser (app or other interface) operating on the user computing entity 30, and/or the like. For example, a socket connection may be established such that the client module 35 and/or other application operating on the user computing entity 30 may receive one or more digital media items, metadata associated with one or more digital media items, interactively provide user feedback, and/or the like from/to the provider system 200, CDN 10, and/or the like. For example, the communication session between the user computing entity 30 and the provider system 200 and/or the CDN 10 may be made via the Internet or other IP-based network, through a wired or wireless connection, or other network connection.

At step/operation 404, it is determined if a new personalized entertainment network is to be created. For example, a user may wish to experience one or more media items in accordance with a personalized entertainment network that the user has previously established or the user may wish to establish a personalized entertainment network for experiencing one or more media items. For example, the user (e.g., operating the user computing entity 30) may provide input indicating that the user would like to experience one or more digital media items in accordance with a previously established personalized entertainment network or input indicating that the user would like to establish a new personalized entertainment network. The provider system 200 (or the CDN 10) may receive the user input and/or an indication thereof, and, based at least in part thereon, determine if a new personalized entertainment network is to be created. If it is determined at step/operation 404 that a new personalized entertainment network is to be established, the process continues to step/operation 406.

At step/operation 406, network profile information/data is requested. For example, the provider system 200 and/or user computing entity 30 may request network profile information/data. For example, the user computing entity 30 may provide the user with a user interface for providing network profile information/data. In various embodiments, the network profile information/data may comprise user selection of one or more classes of media items, geographic information/data for the user, demographic information/data for the user (e.g., an age of the user), one or more interests of the user, a title for the network (e.g., "Aden's network", "I <3 Finn," and/or the like. For example, the age of the user may be requested to ensure that any media items provided to the user are suitable for the user. In another example, the network title may be used to identify the personalized entertainment network for future viewing, and/or the like. In yet another example, the user may be asked to select one or more classes that the user likes, are the user's favorite classes, and/or the like. The provider system 200 may then receive user input and/or user selection providing the network profile information/data.

Figure 5:
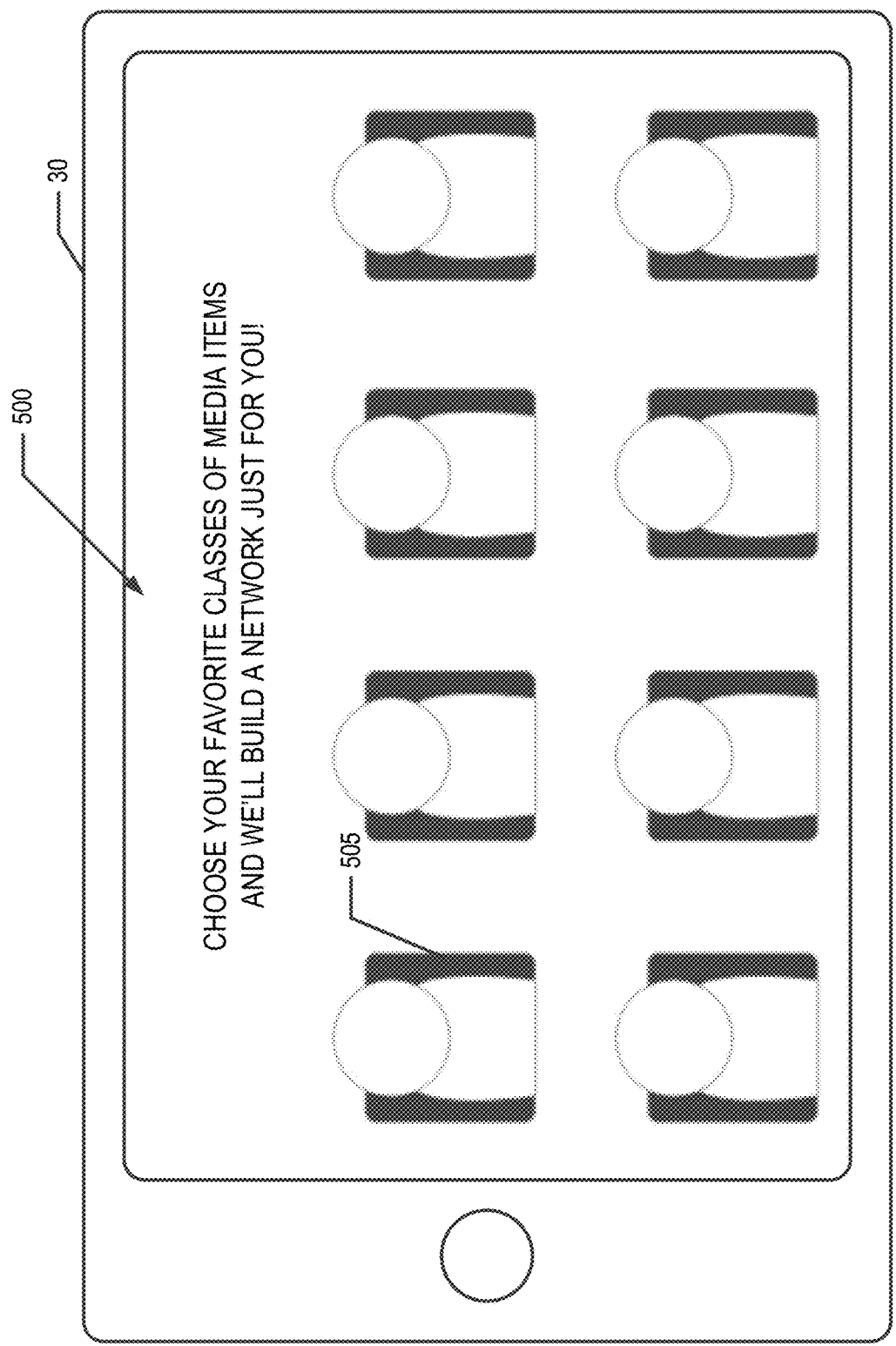

In an example embodiment, the user computing entity 30 may provide a user interface 500, as shown in FIG. 5, for providing network profile information. In an example embodiment, a user may be asked to select one or more classes of media items that the user likes. For example, the user interface 500 shown in FIG. 5 displays eight different class icons 505 that a user may select. In various embodiments, a user may select none of the class icons 505, one or more of the class icons, and/or all of the class icons. In an example embodiment, each class icon 505 may visually represent a class of media items. For example, a class of media items may be a television show (e.g., a cartoon show) and the media items of that class may be episodes, clips, shorts, and/or the like associated with that television show. In various embodiments, the classes for which class icons 505 are provided for user selection may be a subset of all the of the classes available via the personalized entertainment network, all of the classes available via the personalized entertainment network, and/or the like. In various embodiments, user selection of a class icon 505 may indicate that a user likes the class represented by the class icon 505. The user may select as many of the class icons 505 as desired and submit the selections. The user computing entity 30 may then provide the user selection(s) (or lack thereof) to the provider system 200.

Continuing with FIG. 4, at step/operation 408, the personalized entertainment network is built. For example, the provider system 200 may build the personalized entertainment network. In various embodiments, the personalized entertainment network may be built in response to the provider system 200 and/or the user computing entity 30 (e.g., the client module 35) receiving the network profile information/data. In various embodiments, the personalized entertainment network may comprise an ordered set of digital media items and/or media item identifiers. Each media item identifier may be configured to uniquely identify at least one digital media item. In example embodiments, each media item identifier or digital media item of the ordered set is associated with a cardinality index. The cardinality index indicates the corresponding media item identifier and/or digital media item's position within the ordered set. For example, the first item identifier and/or digital media item of the ordered set may be associated with the cardinality index 0 (or 1). The next second media item identifier and/or digital media item of the ordered set may be associated with the cardinality index of 1 (or 2). In example embodiments, each cardinality index is unique and the set of cardinality indexes are continuous. For example, there are no two media item identifiers and/or digital media items that are associated with the same cardinality index. In another example, if a media item identifier is associated with the cardinality index of 4, then there are media item identifiers associated with the cardinality indexes of 1, 2, and 3. An example of building a personalized network is described in more detail below.

Figure 8:
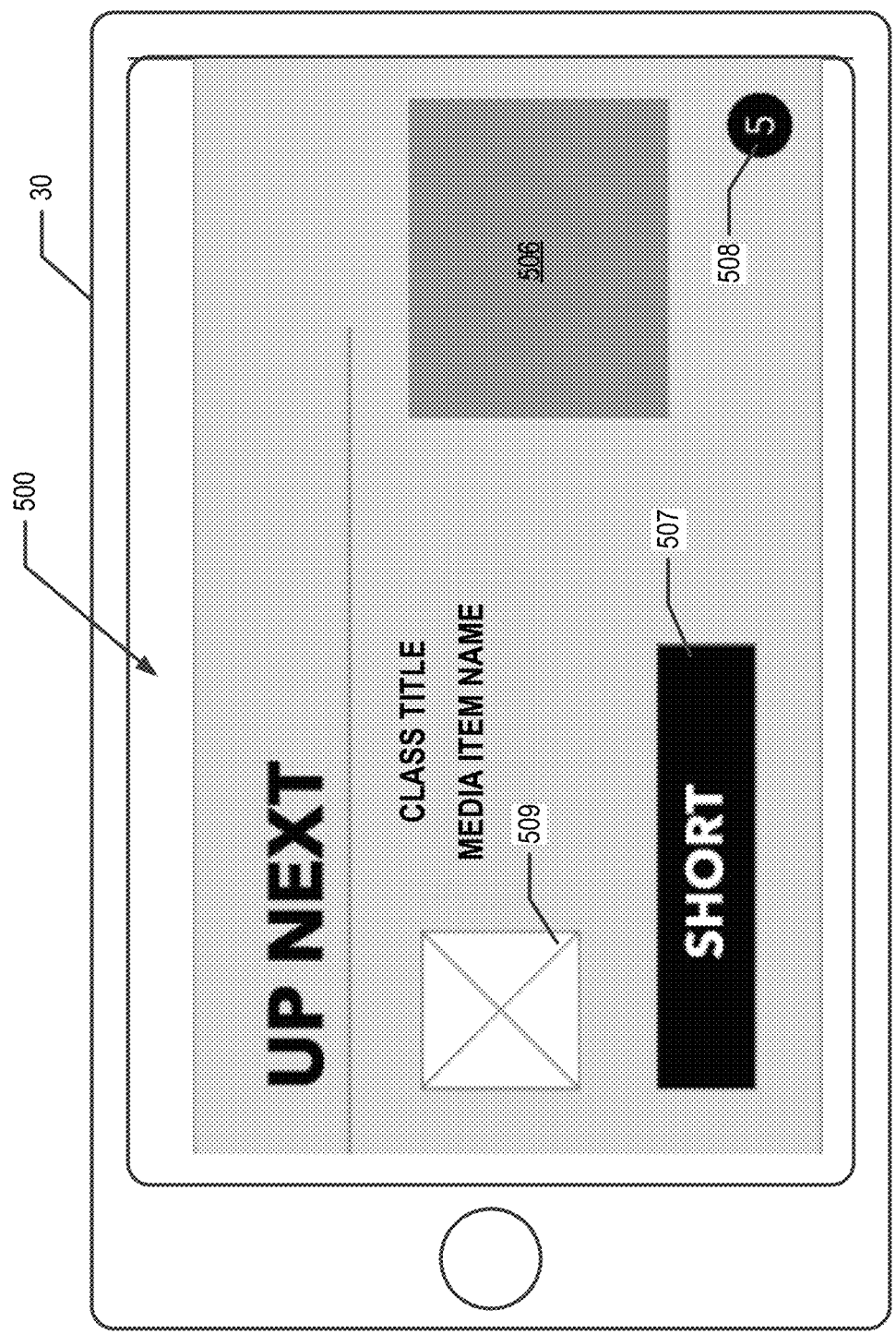

Continuing with FIG. 4, at step/operation 410, a media item intro slate for the first media item of the personalized entertainment network may be provided. For example, the provider system 200 may provide a media item intro slate for the first media item of the personalized entertainment network. For example, the first media item of the personalized entertainment network may be the media item associated with the first cardinality index and/or the first cardinality index for which the corresponding media item has not yet been provided. For example, the intro slate may indicate which digital media item is to be provided. FIG. 8 illustrates an example media item intro slate. The user interface 500 shows the name of the class corresponding to the media item about to be provided, the name of the media item about to be provided, the type 507 of the media item about to be provided, an image 509 corresponding to the media item or the class, and/or the like. In various embodiments, the media item intro slate may include an advertisement 506, a sponsored by message, and/or the like. The media item intro slate may further include a timer 508. The timer 508 may count down the time until the media item introduced by the media item intro slate is provided. For example, the timer 508 may count down five seconds. In various embodiments, the media item intro slate is provided to allow the next media item to be buffered by the user computing entity 30. Thus, the timer 508 may be set to allow for an appropriate buffering time based on the speed of the connection between the user computing entity 30 and the provider system 200 and/or the CDN 10.

At step/operation 412, the digital media item is provided. For example, the provider system 200 and/or CDN 10 may provide the digital media item and the user computing entity 30 may display the digital media item via the user interface thereof. As indicated above, the provided digital media item corresponds to the first position and/or the next position for which the media item has not yet been provided (e.g., position 3 if the media item assigned to position 2 was the last media item provided).

Figure 9:
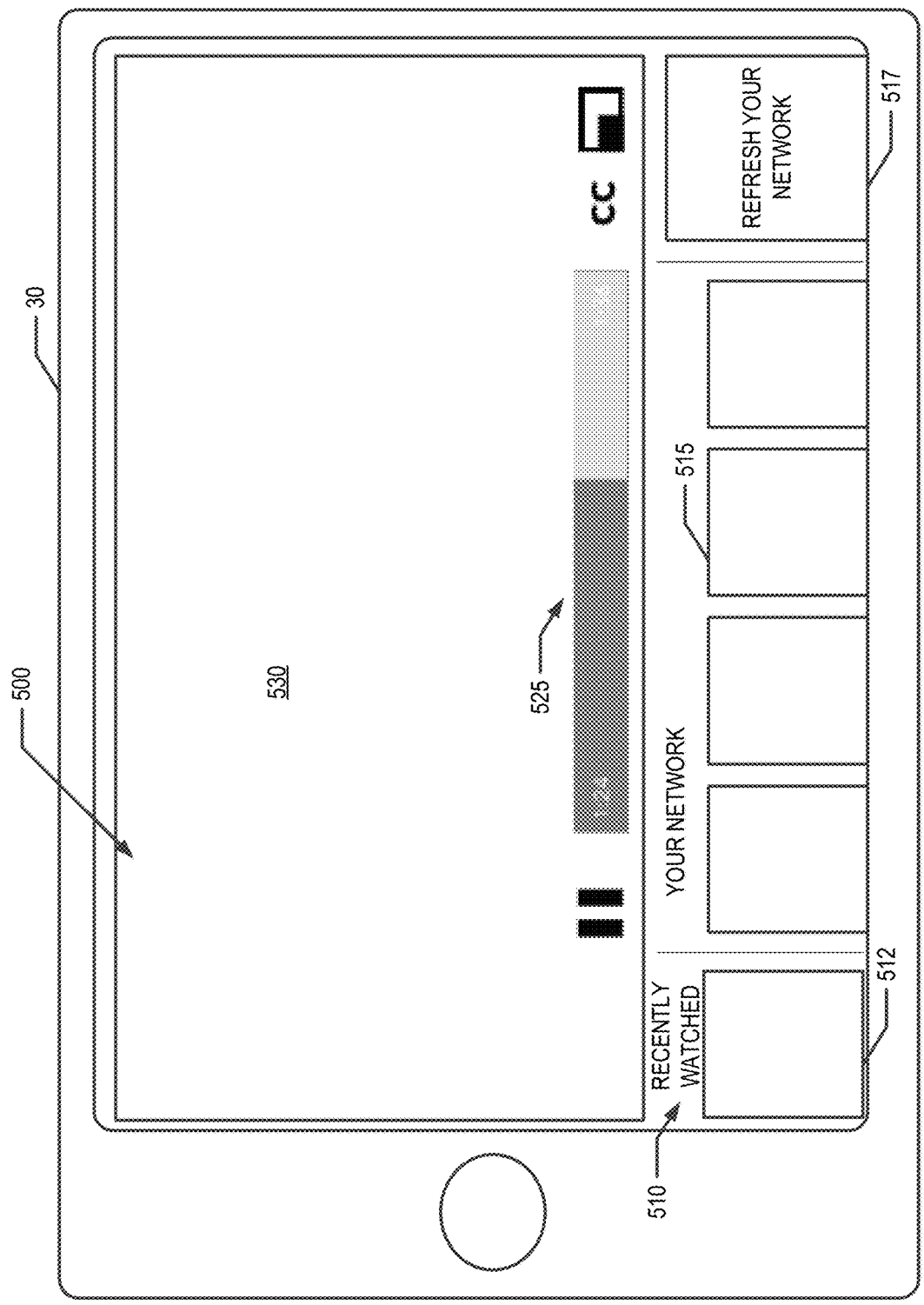

FIG. 9 illustrates an example user interface 500 provided by the user computing entity 30 (e.g., by the client module 35) through which a digital media item may be provided. In various embodiments, the user interface 500 may comprise a video portion/region 530, video controls 525, and a network control portion/region 510. The video portion/region 530 may be configured to display the video and/or visual portion of a digital media item. The video controls 525 may allow a user to adjust various properties of the video. For example, the video controls 525 may comprise a pause/play control, full screen control, volume control, closed caption control, time scrub for the video, and/or the like. The network control portion/region 510 may comprise a recently watched tile 512, upcoming tiles 515, and a refresh your network button 517. The recently watched tile 512 may indicate the last media item or the class of the last media item provided. For example, if the current media item being provided by the user interface 500 corresponds to position/cardinality index 8, the recently watched tile 512 may visually indicate the media item or the class of the media item corresponding to position/cardinality index 7. The upcoming tiles 515 may indicate the media items and/or classes of the media items corresponding to the next several positions/cardinality indexes. For example, if the current media item being provided by the user interface 500 corresponds to position/cardinality index 8, the four illustrated upcoming tiles 515 may visually indicate the media items or the classes of the media items corresponding to positions/cardinality indexes 9, 10, 11, and 12. In various embodiments, the user may be able to scroll through a predetermined number of upcoming tiles 515. The refresh your network button 517 may allow a user to request that the personalized entertainment network be updated and/or rebuilt. In various embodiments, the user may view the media item in full screen mode in which the network control portion/region 510 and the video controls 525 are removed and the video portion/region 530 is expanded to fill the full screen.

Returning to FIG. 4, if at step/operation 404 it is not determined that a new network is not be created, the process may continue to step/operation 412. At step/operation 412, network identifying information/data is received. For example, a user (e.g., operating a user computing entity 30) may provide input identifying a network. The user computing entity 30 may forward the input identifying the network and/or the network identifying information/data to the provider system 200 such that the provider system 200 receives the network identifying information/data. For example, the network identifying information/data may comprise the user entering the name of the network, logging into a user profile and selecting the personalized entertainment network from a list of one or more personalized entertainment networks associated with the user profile, and/or the like.

At step/operation 414, the network identified by the network identifying information/data may be rebuilt/updated. For example, the provider system 200 may rebuild and/or update the identified network. For example, a process similar to that described with respect to FIG. 6 may be completed to rebuild and/or update the identified network. In example embodiments, classes may have been previously assigned to one or more positions that have not been provided to the user and the personalized entertainment network may be updated by assigning new media items (e.g., media items flagged as new content and/or associated with a new item indicator) to these positions based on the previous class assignments, and/or the like. In other embodiments, the personalized entertainment network may be rebuilt from scratch based on the network profile. FIG. 7D shows an example of how classes may be assigned to positions in the rebuilt/updated network. In response to rebuilding and/or updating the network, the process may continue to step/operation 410 shown in FIG. 4 and the media item intro slate for the next media item may be provided.

Building a Personalized Network

Figure 6:
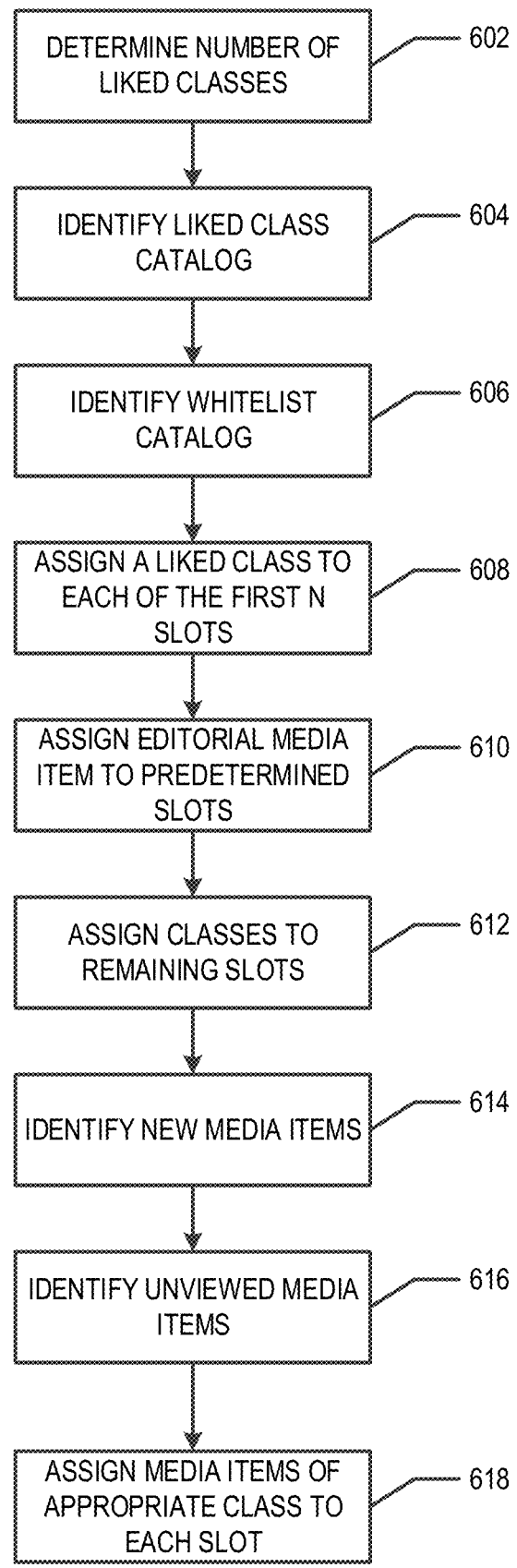

FIG. 6 provides a flowchart illustrating how a personalized entertainment network is built (or rebuilt) in various example embodiments. In various embodiments, a personalized entertainment network is built when a user (e.g., operating a user computing entity 30) requests a new personalized entertainment network. The personalized entertainment network may be rebuilt when the user opens a new communication session and accesses an existing personalized entertainment network and/or when a user requests a personalized entertainment network be refreshed. A personalized entertainment network may be updated in response to user input selecting a media item to be provided now, selecting a media item to be provided next, requesting a media item and/or class be removed from the personalized entertainment network, providing user feedback that causes a class status to be updated, and/or the like. When the personalized entertainment network is updated, at least some of the positions of the ordered set may be updated, but the personalized entertainment network need not be built from scratch. For example, positions having a media item assigned thereto that corresponds to a class that a user has requested to have removed from the personalized entertainment network will have a different media item assigned thereto in accordance with the rules of building the personalized entertainment network; however, other positions may not be affected.

Starting at step/operation 602, the number of liked classes are identified. For example, the provider system 200 and/or user computing entity 30 may identify the number of liked classes. For example, the network profile information/data may include an indication of which classes the user has provided user input indicating the user likes and/or loves. For example, as described above with respect to step/operation 406, a user may provide input indicating the user likes zero, one or two, three or more, and/or all of the classes provided for the user to select. In some embodiments, a class that a user likes and a class that a user loves may be treated similarly when assigning classes to positions of a personalized network, as described below. In other embodiments, a class that a user loves may be assigned to more positions of a personalized network than a class that a user likes and/or may otherwise be preferentially treated in the building, rebuilding, updating, and/or refreshing of the personalized network.

At step/operation 604, the liked class catalog is identified. For example, the provider system 200 and/or user computing entity 30 may identify the catalog of liked classes. For example, if the network profile information/data indicates that the user likes Class 1 and Class 2, the catalog of liked classes may comprise Class 1 and Class 2 and digital media items corresponding thereto. At step/operation 606, the whitelist catalog is identified. For example, the provider system 200 may identify the whitelist catalog. In various embodiments, the whitelist catalog may comprise any class that is not in the catalog of liked classes and not in the dead zone (e.g., list of classes for which media items should not be provided) and digital media items corresponding thereto. For example, the whitelist catalog may comprise classes for which no user feedback has been received or classes that user input indicating that the user does not like the class has been received. For example, a network may comprise media items corresponding to four classes (e.g., Class 1, Class 2, Class 3, and Class 4). The network profile information/data may indicate that the user likes Class 1 and Class 2 (e.g., a user operating a user computing entity 30 has provided user input indicating the user likes Class 1 and Class 2) and may indicate that the user does not want media items corresponding to Class 4 to be provided (e.g., a user operating a user computing entity 30 has provided input indicating that Class 4 should be in the dead zone). Thus, the whitelist catalog may comprise Class 3 and media items corresponding thereto.

Continuing to step/operation 608, a class from the liked class catalog is assigned to each of the first N positions. For example, the provider system 200 may assign a class from the liked class catalog to each of the first N positions. In various embodiments, N is a predetermined integer (e.g., 2). For example, if the liked class catalog comprises Class 1 and Class 2, Class 2 may be assigned to the first position and Class 1 may be assigned to the second position, and/or the like. If the liked class catalog is empty (e.g., no user input indicating a user likes a class has been received), the first N positions are assigned classes from the whitelist catalog. In various embodiments, the first position corresponds to the cardinality index of 0 (or 1), the second position corresponds to the cardinality index of 1 (or 2), and/or the like. Thus, being assigned to the kth position corresponds to being assigned the kth cardinality index.

At step/operation 610, a digital media item comprising editorial content may be assigned to one or more predetermined positions. For example, the provider system 200 and/or user computing entity 30 may assign editorial content media item to one or more predetermined positions. In various embodiments, editorial content media item may be a media item associated with the editorial class. For example, the network profile information/data may indicate that a user has not viewed a particular editorial content media item. The particular editorial content media item may then be assigned to a predetermined position. For example, the editorial content media item may be assigned to position 3, 8, and/or 18. In various embodiments, the predetermined position that the editorial content media item is assigned to may be the N+1 position.

At step/operation 612, classes may be assigned to the remaining positions. For example, the provider system 200 and/or user computing entity 30 may assign classes to the remaining positions. In various embodiments, the personalized entertainment network may comprise 20 positions, 25 positions, 30 positions, 50 positions, and/or the like. For example, a class is assigned to each position of the personalized entertainment network that has not yet been assigned a class. If the network profile information/data indicates that the user has zero liked classes, then each of the remaining positions is assigned a class from the whitelist class catalog. If the network profile information/data indicates that the user has liked one or two classes, then each of the remaining positions is assigned a class by assigning classes to two consecutive positions from the liked class catalog, and then the following position is assigned a class from the whitelist class catalog. If the network profile information/data indicates that the user liked three or more classes, then each of the remaining positions is assigned a class by assigning classes to four consecutive positions from the liked class catalog and the following position is assigned a class from the whitelist class catalog. Thus, each position of the personalized entertainment network is assigned a class and the assignment of the classes is based at least in part on the classes the user has liked and/or the network profile information/data.

FIGS. 7A, 7B, and 7C show the first nine positions of example personalized entertainment networks. The personalized entertainment network shown in FIG. 7A corresponds to a network profile having no liked classes. The personalized entertainment network shown in FIG. 7B corresponds to a network profile having one or two liked classes. Similarly, the personalized entertainment network shown in FIG. 7C corresponds to a network profile having three or more liked classes. As shown in FIG. 7A, for a personalized entertainment network corresponding to a network profile having zero liked classes, the first N positions (e.g., 2 positions) are assigned classes from the whitelist class catalog, the next position (e.g., position 3) is assigned editorial content, and the remaining positions are assigned classes from the whitelist catalog. As shown in FIG. 7B, for a personalized entertainment network corresponding to a network profile having one or two liked classes, the first N positions (e.g., 2 positions) are assigned classes from the catalog of liked classes, the next position (e.g., position 3) is assigned editorial content, and the remaining positions are assigned classes from the catalog of liked classes and the whitelist class catalog in a two liked classes, 1 whitelist class pattern. As shown in FIG. 7C, for a personalized entertainment network corresponding to a network profile having three or more liked classes, the first N positions (e.g., 2 positions) are assigned classes from the catalog of liked classes, the next position (e.g., position 3) is assigned editorial content, and the remaining positions are assigned classes from the catalog of liked classes and the whitelist class catalog in a four liked classes, 1 whitelist class pattern.

Returning to FIG. 6, at step/operation 614, new media items are identified. For example, the provider system 200 may identify new media items. In various embodiments, new media items may be digital media items that have just been added to the catalog of available media items within the past day, past seven days, past two weeks, past month, and/or the like. In various embodiments, new media items may be associated with a new item identifier and may be identified based thereon. For example, the new media items for each class of the liked class catalog and/or the whitelist class catalog may be identified. At step/operation 616, the unviewed media items are identified. For example, the provider system 200 may identify the unviewed media items. For example, the network profile information/data may indicate all of the media items that have been provided through the personalized entertainment network profile. Therefore, based on the network profile, one or more media items that have not yet been provided through the personalize network profile (e.g., media items that have not been viewed) are identified. For example, the unviewed media items for each class of the liked class catalog and/or the whitelist class catalog may be identified.

At step/operation 618, a media item is assigned to each position based on class. For example, the provider system 200 and/or the user computing entity 30 may assign a media item to each position based on class. For example, the first position may be assigned Class 2. A media item associated with Class 2 may be assigned to the first position. In various embodiments, media items that are both new and unviewed are assigned before assigning other media items associated with the particular class. For example, if Class 2 has four media items associated therewith, and two of the media items are new and unviewed, one of the media items is unviewed but not new, and the fourth media item is already been viewed, than the first Class 2 position will be randomly assigned one of the two new and unviewed media items, the second Class 2 position will be assigned the other of the two new and unviewed media items, and the third Class 2 position will be assigned the unviewed but not new media item. Thus, all of the positions of the personalized entertainment network may be assigned media items.

Figure 10:
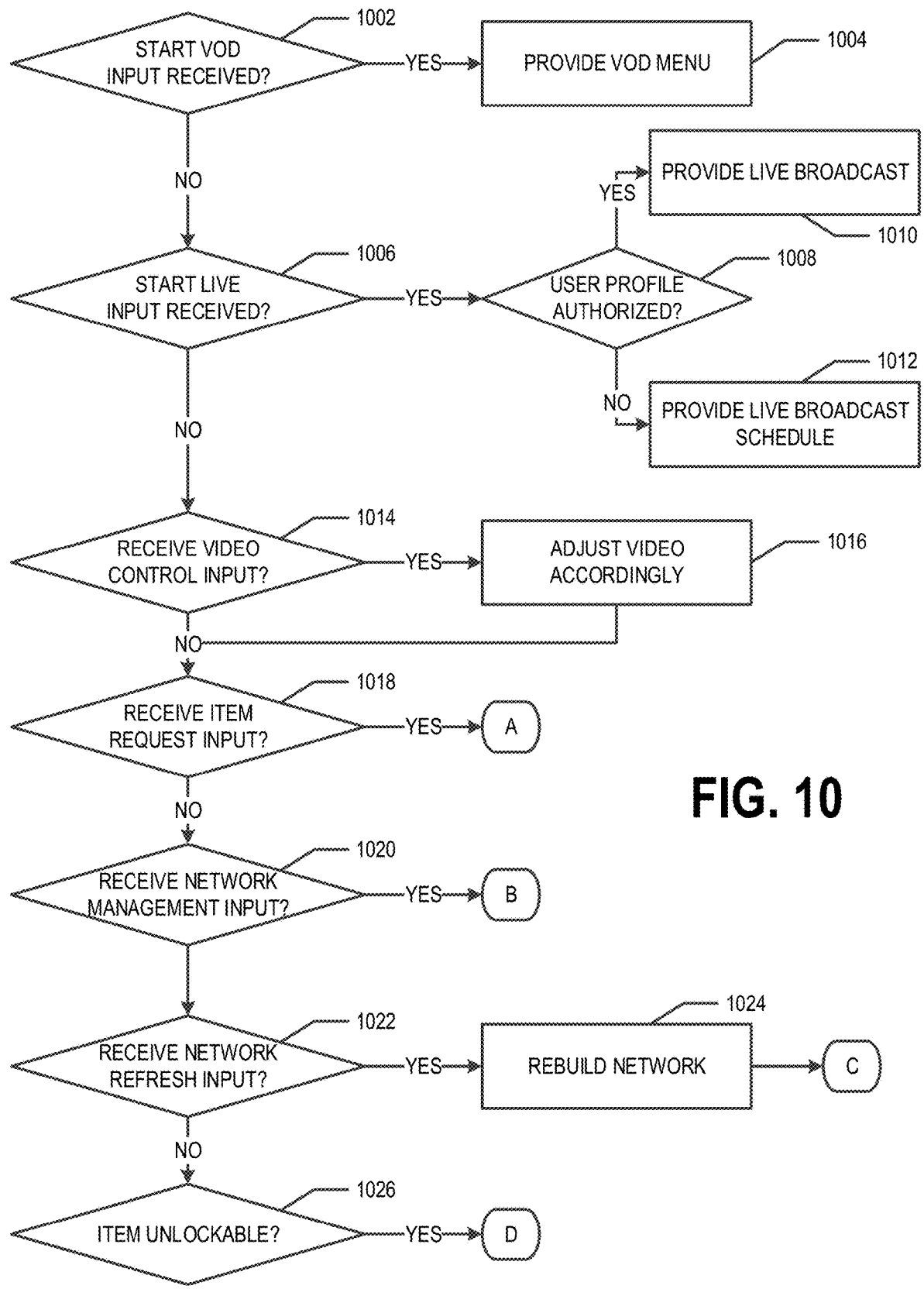

Examples of User Input that May be Received while Providing a Personalized Network As indicated above, a variety of user input may be received by the user computing entity 30 (e.g., through the user interface 500 provided by the user computing entity 30) and/or the provider system 200 (e.g., provided by the user computing entity 30) while providing a personalized entertainment network to a user. FIG. 10 is a flowchart illustrating examples of some of the various user inputs that may be received while providing a personalized entertainment network to a user and the processes and procedures that may be initiated by the noted user inputs.

Figure 11A:
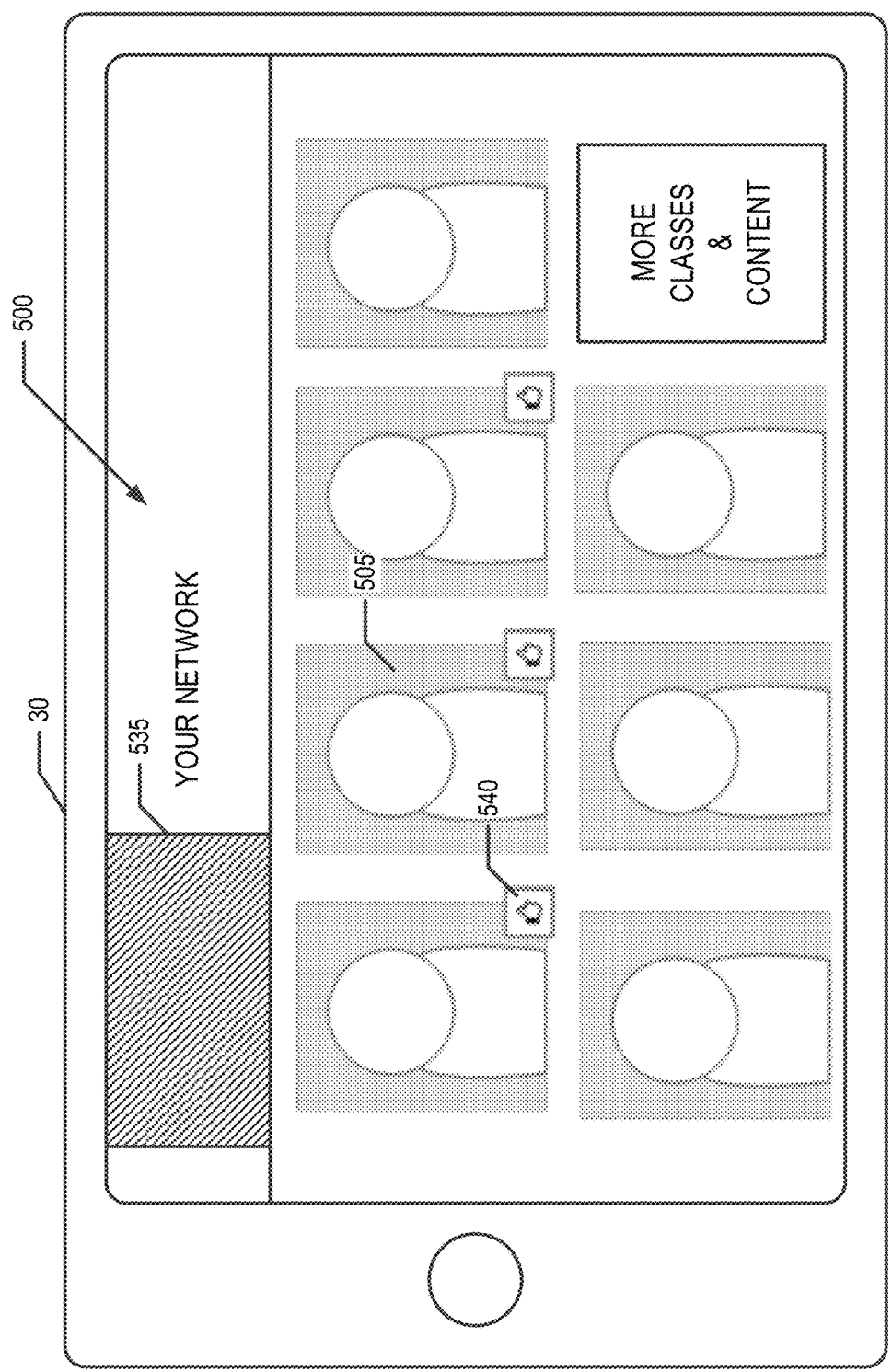
Figure 11B:
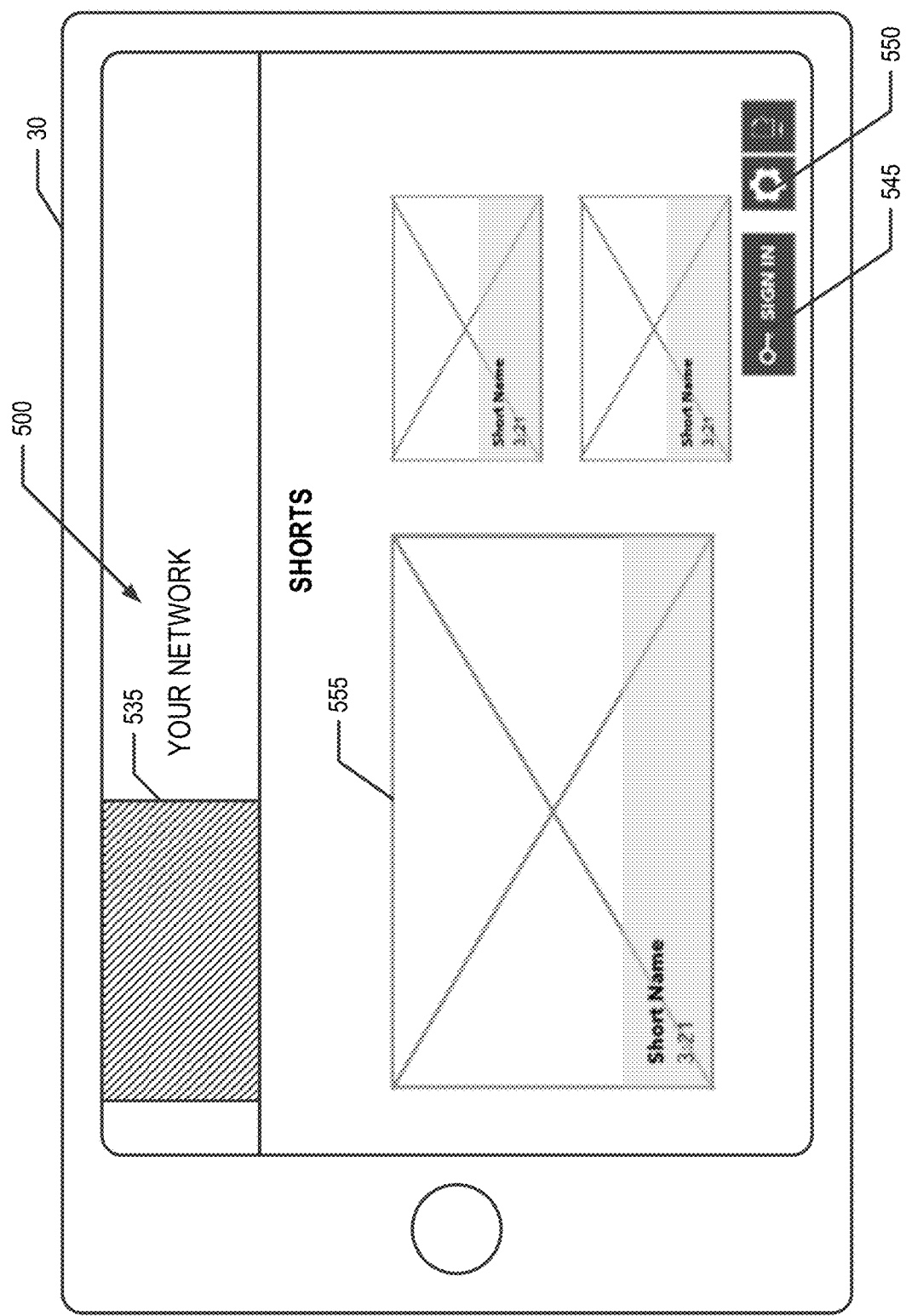

Starting at step/operation 1002, it is determined if input indicating the user would like to view VOD has been received. For example, the provider system 200 and/or the user computing entity 30 may determine if input indicating the user would like to view VOD content has been received. If it is determined that input indicating the user would like to view VOD has been received, the VOD menu may be provided at step/operation 1004. For example, the provider system 200 and/or the user computing entity (e.g., via the client module 35) may provide the VOD menu through user interface 500. FIGS. 11A and 11B illustrate example user interface screenshots of an example VOD menu. If a media item (and/or advertisement) was being provided through the personalized entertainment network when the input indicating the user would like to view VOD was received, the media item (and/or advertisement) that was being provided continues to be provided in the reduced video portion/region 535. In some embodiments, the media item that was being provided may be paused and provided in the reduced video portion/region 535. In some embodiments, the media item that was being provided may continue playing and be provided in the reduced video portion/region 535. In one form, as shown in FIG. 11A, the VOD menu may comprise one or more class icons 505 provided for user selection such that a user may select a class icon 505 and be taken to the class homepage for selecting one or more media items of the selected class for VOD viewing. A like indicator 540 may be provided next to and/or partially overlapping with class icons 505 corresponding to classes that the user has liked in one or more personalized entertainment networks. In various embodiments, the class icons 505 corresponding to the liked classes may be listed before the other class icons. In the VOD menu form shown in FIG. 11B, a user may select a type of media item (e.g., clips, shorts, full episodes, unlocked episodes, and/or the like) and be provided with one or more item icons 555. The provided item icons 555 may correspond to digital media items of the selected type and correspond to a variety of classes. The user may select an item icon 555 to begin viewing the digital media item corresponding to the item icon 555.

Returning to FIG. 10, if it is determined that input indicating the user would like to view VOD content has not been received, the process continues to step/operation 1006. At step/operation 1006, it is determined if input indicating the user would like to view the live television broadcast (or information/data related thereto) has been received. For example, the provider system 200 and/or the user computing entity 30 may determine if input indicating the user would like to view the live television broadcast and/or information/data related thereto has been received. For example, the user (e.g., operating the user computing entity 30) may select a button or otherwise provide input indicating the user would like to view the live television broadcast and/or information/data related thereto.

If it is determined at step/operation 1006 that that input indicating the user would like to view the live television broadcast and/or information/data related thereto, the process continues to step/operation 1008. At step/operation 1008, it is determined if the user is an authorized user. For example, the provider system 200 and/or the user computing entity 30 may determine if the user is an authorized user. In example embodiments, an authorized user may be a user having a paid or unpaid subscription associated with the provider system 200, the CDN 10, and/or associated entities. Authorized users may be provided access to content, digital media items, and/or portions thereof to which unauthorized users are not provided access. Thus, it may be determined if the user (e.g., operating the user computing entity 30) is logged into a user account/profile that is authorized. For example, the user profile of an authorized user may have subscription information/data stored in association therewith. Thus, in some embodiments, to determine if a user is an authorized user, the user may be asked to provide user log in credentials for a corresponding user account/profile. If the user is not an authorized user, and/or does not provide the appropriate credentials and/or other information/data required to determine that the user is an authorized user, the user is provided with live television broadcast schedule information/data, at step/operation 1012.

Figure 12:
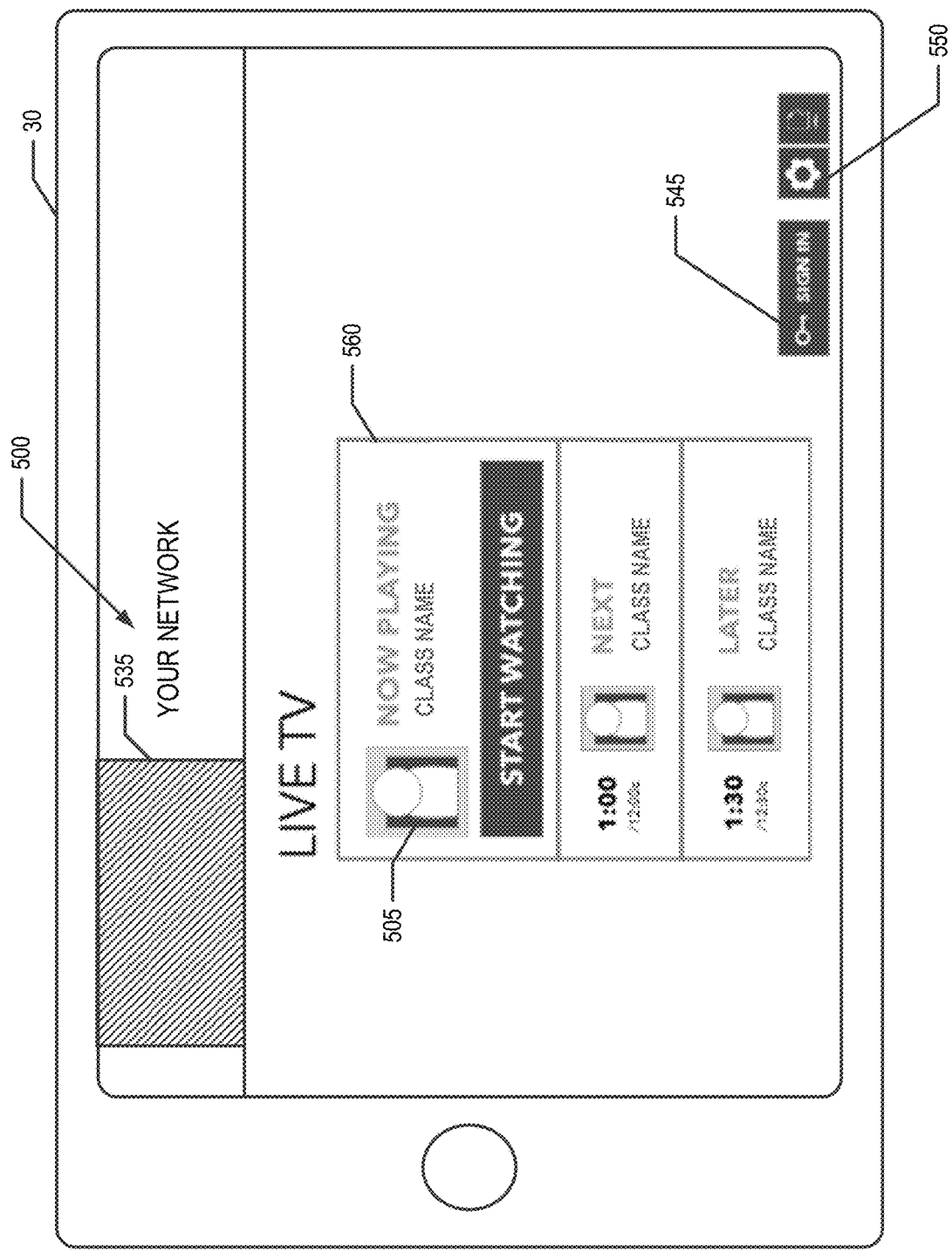
Figure 13:
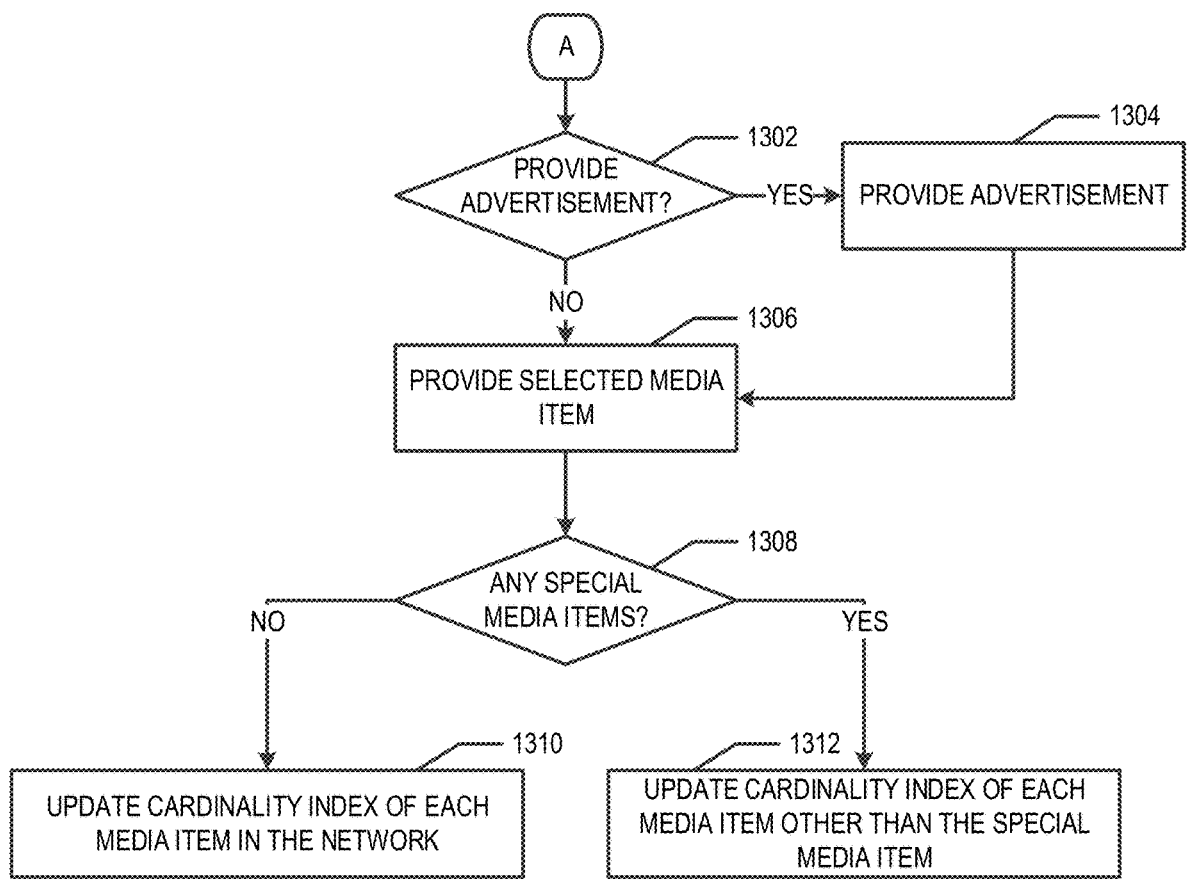

FIG. 12 provides an example screenshot of the user interface 500 providing the live television broadcast schedule information/data. When displaying the live television broadcast schedule information/data, any digital media item that was being provided when the input indicating the user would like to view the live television broadcast and/or information/data related thereto was received may continue to be provided in the reduced video portion/region 535. In some embodiments, the media item being provided in the reduced video portion/region 535 is paused. The live broadcast schedule information/data 560 may be provided. For example, the live broadcast schedule information/data 560 may indicate the class for which a media item is currently being provided via the live television broadcast, and the programming scheduled for the next hour, next several hours, and/or the like. The user interface 500 may further comprise a sign in button 545, a settings button 550, and/or other controls.

Returning to FIG. 10, if at step/operation 1008 it is determined that the user is an authorized user, the live television broadcast may be provided to the user. For example, the media item currently being provided by the live television broadcast may be provided to the user (e.g., operating the user computing entity 30) in the video portion/region 530 of the user interface 500. For example, the provider system 200 and/or the CDN 10 may provide the live television broadcast and the user computing entity 30 may receive the live television broadcast and provide it to the user.

Continuing with FIG. 10, if at step/operation 1006 it is determined that input indicating the user would like to view the live television broadcast (or information/data related thereto) has not been received, the process continues to step/operation 1014. At step/operation 1014, it is determined if video control input has been received. For example, the provider system 200 and/or user computing entity 30 may determine if video control input has been received. For example, a user may select one or more video controls 525 (e.g., a pause/play control, full screen control, volume control, closed caption control, time scrub for the video, and/or the like) through the user interface 500. If it is determined at step/operation 1014 that video control input has been received, then at step/operation 1016, the adjustment indicated by the video control input is made. For example, the user computing entity 30 and/or the provider system 200 may adjust the presentation of the media item in accordance with the received video control input. For example, if the video control input was selection of the pause/play control, the media input may be paused or may commence playing, as appropriate.

If at step/operation 1014 it is determined that video control input has not been received, the process continues to step/operation 1018. At step/operation 1018, it is determined if an item request input has been received. For example, the provider system 200 and/or the user computing entity 30 may determine if item request input has been received. For example, a user may select an upcoming tile 515 to request that the digital media item represented by the selected upcoming tile 515 be provided. If it is determined that item request input has been received, the process continues to step/operation 1302 shown in FIG. 13.

At step/operation 1302, it is determined if an advertisement should be provided. For example, the provider system 200 and/or the user computing entity 30 may determine if an advertisement should be provided. If it is determined that an advertisement should be provided, then the advertisement is provided at step/operation 1304. For example, the provider system 300 and/or the user computing entity 30 may provide an advertisement (e.g., in the video portion/region 530) at step/operation 1304. If it is determined that an advertisement should not be provided, the process continues to step/operation 1306.

At step/operation 1306, the digital media item corresponding to the user input (e.g., the user selection of an upcoming tile 510) may be provided. For example, the provider system 200 and/or the user computing entity 30 may provide the digital media item corresponding to and/or indicated by the user input. At step/operation 1308, it may be determined if a special media item is present in the personalized entertainment network. In example embodiments, a special media item may be an interactive media item, a game, special content (e.g., special daily content), and/or the like. The special media item may be assigned to a random position and/or cardinality index. For example, each day, each week, and/or the like, the provider system 200 may assign a special media item to a random position in one or more personalized entertainment networks. The special media item may be configured such that the special media item maintains its assigned position/cardinality index regardless of the personalized entertainment network being updated, rebuilt, adjusted, and/or the like.

If it is determined that a special media item is present in the personalized entertainment network, the cardinality index of the media items of the personalized entertainment network are updated for each media item except the special media item, at step/operation 1312. For example, a user may be viewing the media item associated with cardinality index 3 and select to view the media item associated with cardinality index 5. A special media item may be assigned to cardinality index 6. The media item previously assigned to cardinality index 5 is reassigned to cardinality index 3, the special media item stays at cardinality index 6, the media items previously assigned to cardinality indexes 7 and 8 are reassigned to cardinality indexes 4 and 5, and the media items previously assigned to cardinality indexes 9, 10, and so forth are reassigned to cardinality indexes 7, 8, and so forth respectively. The digital media items previously assigned to cardinality indexes 3 and 4 may be removed from the personalized entertainment network and/or reassigned to later positions within the personalized entertainment network (e.g., cardinality indexes 24 and 32, and/or the like).

If at step/operation 1308 it is determined that a special media item is not present in the personalized entertainment network (or may have been assigned to a cardinality index less than the cardinality index of the digital media item currently being provided and therefore already provided), the process continues to step/operation 1310. At step/operation 1310, the cardinality index of each digital media item of the personalized entertainment network is updated. For example, a user may be viewing the media item associated with cardinality index 3 and select to view the media item associated with cardinality index 5. The media item previously assigned the cardinality index of 5 may be reassigned to the cardinality index of 3 and the digital media items previously assigned the cardinality indexes of 6, 7, and so forth may be reassigned to cardinality indexes 4, 5, and so forth respectively. The digital media items previously assigned to cardinality indexes 3 and 4 may be removed from the personalized entertainment network and/or reassigned to later positions within the personalized entertainment network (e.g., cardinality indexes 24 and 31, and/or the like).

Returning to FIG. 10, it is determined at step/operation 1020 if network management input has been received. For example, the provider system 200 and/or the user computing entity 30 may determine if network management input has been received. For example, instead of clicking on an upcoming tile 515, the user may select and hold an upcoming tile 515 and be provided with the visual menu shown in FIG. 15. It is interesting to note that a large portion of menus and/or information/data provided to users through the user interface 500 is provided visually such that someone who does not know how to read a particular language or that has a low reading level in a particular language (e.g., a child) may navigate the user interface effectively.

Figure 14:
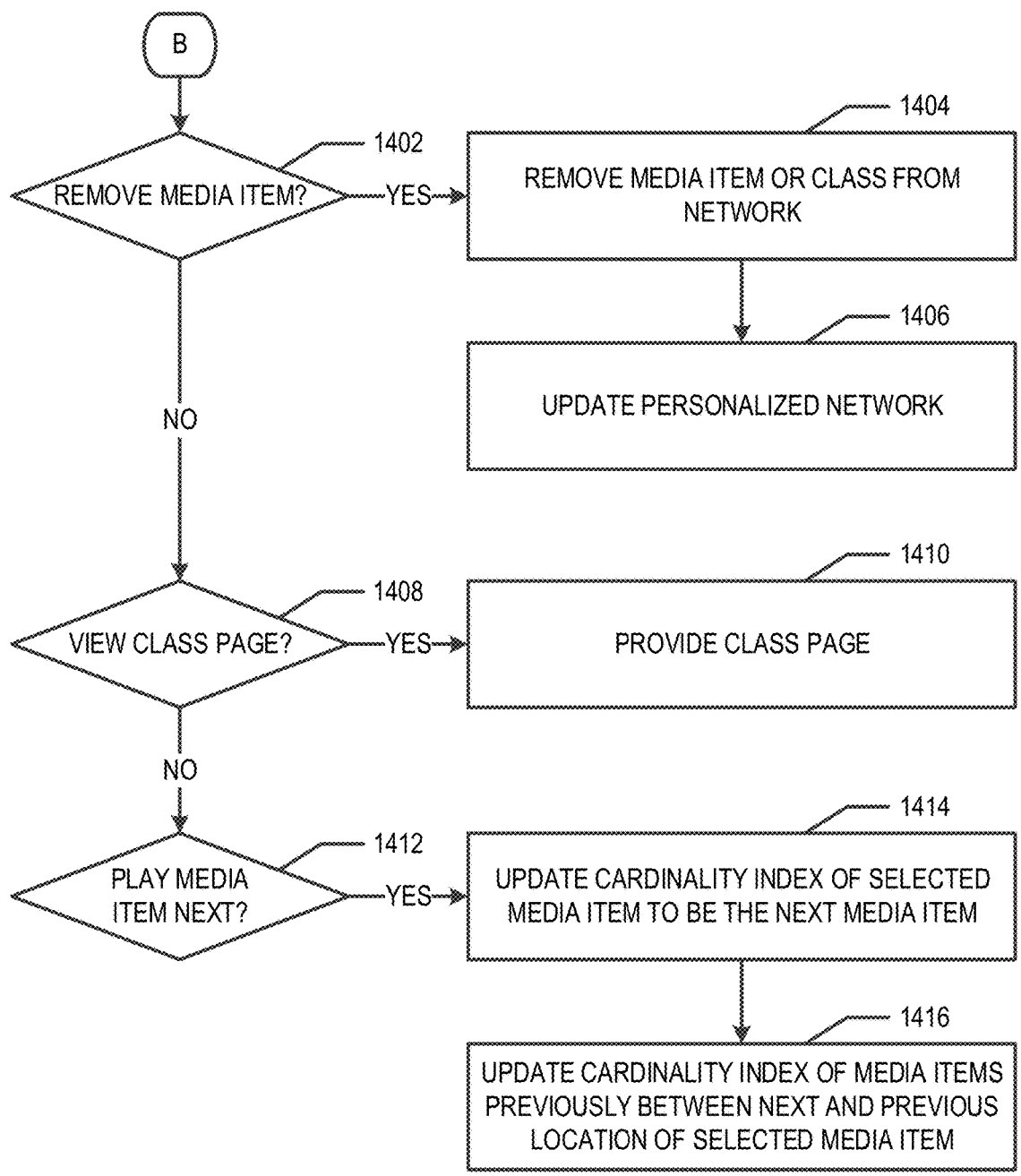
Figure 15:
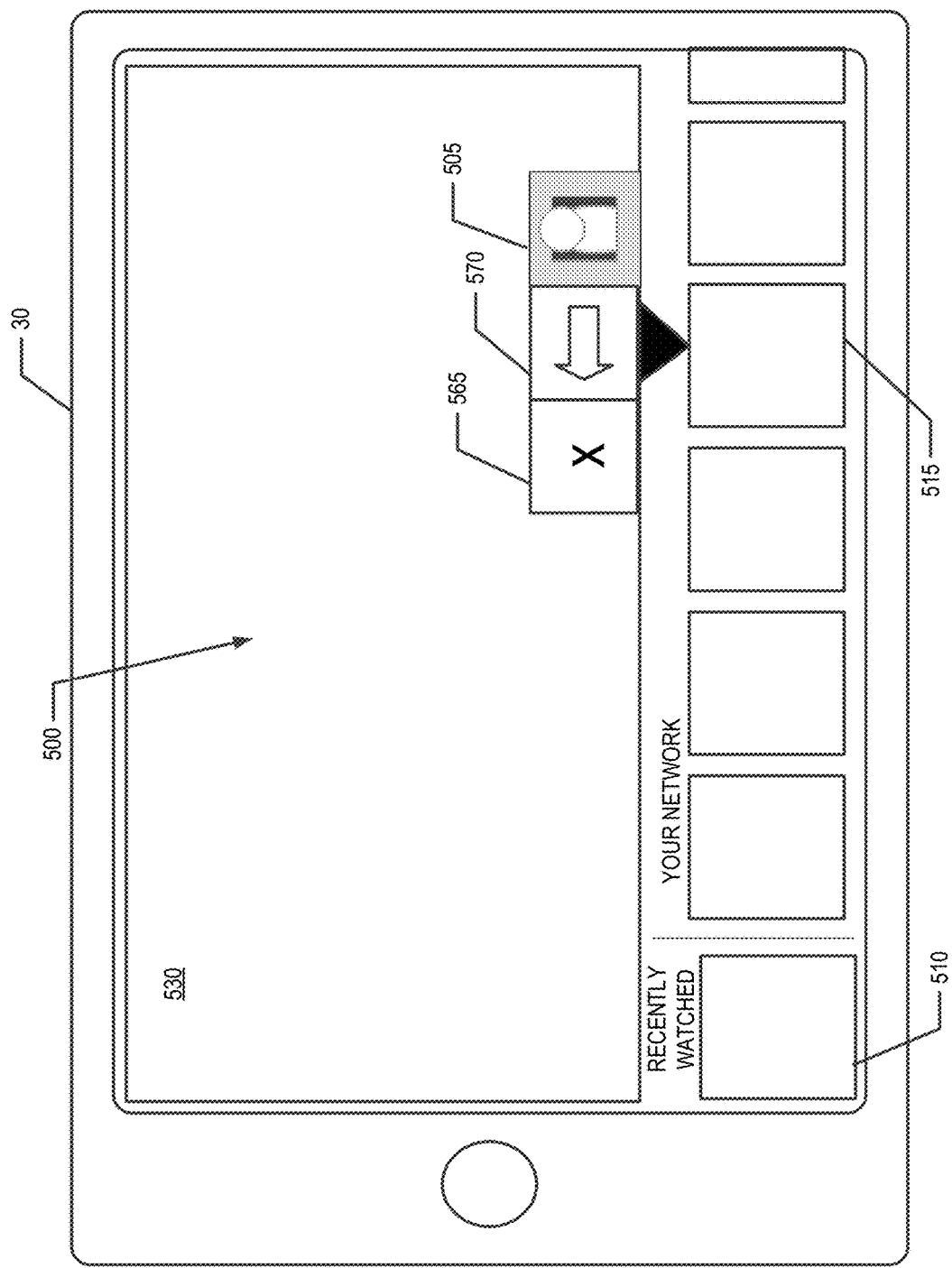

As shown in FIG. 14, if it is determined that network management input has been received, then at step/operation 1402 it is determined if input indicating the digital media item should be removed from the personalized entertainment network has been received. For example, the provider system 200 and/or the user computing entity 30 may determine if user input indicating that the digital media item represented by the selected upcoming tile 515 should be removed from the personalized entertainment network has been received. For example, the user may select the remove button 565 shown in FIG. 15 to indicate that the media item and/or the class of media items to which the selected media item belongs should be removed from the personalized entertainment network. For example, the media item and/or associated class of media items may be moved to the dead zone, as will be described in more detail elsewhere herein.

Continuing with FIG. 14, if at step/operation 1402 it is determined that input indicating the user-selected digital media item and/or the associated class of media items should be removed from the personalized entertainment network has been received, the process continues to step/operation 1404. At step/operation 1404, the user-selected digital media item and/or associated class of media items is removed from the personalized entertainment network. For example, the provider system 200 and/or the user computing entity 30 may remove the user-selected digital media item and/or the associated class of media items from the personalized entertainment network. At step/operation 1406, the personalized entertainment network may be updated. For example, the provider system 200 and/or the user computing entity 30 may update the personalized entertainment network. In various embodiments, the cardinality index of the remaining digital media items may be updated such that any empty positions left by the removal of the digital media item(s) are filled by digital media items previously assigned to positions of the personalized entertainment network in the same order that they were previously assigned to. In some embodiments, a class from the liked class catalog and/or the whitelist class catalog may be assigned to each empty position and a corresponding digital media item may be assigned thereto. In some embodiments, the personalized entertainment network may be updated through a process similar to that described with respect to FIG. 6.

Figure 16:
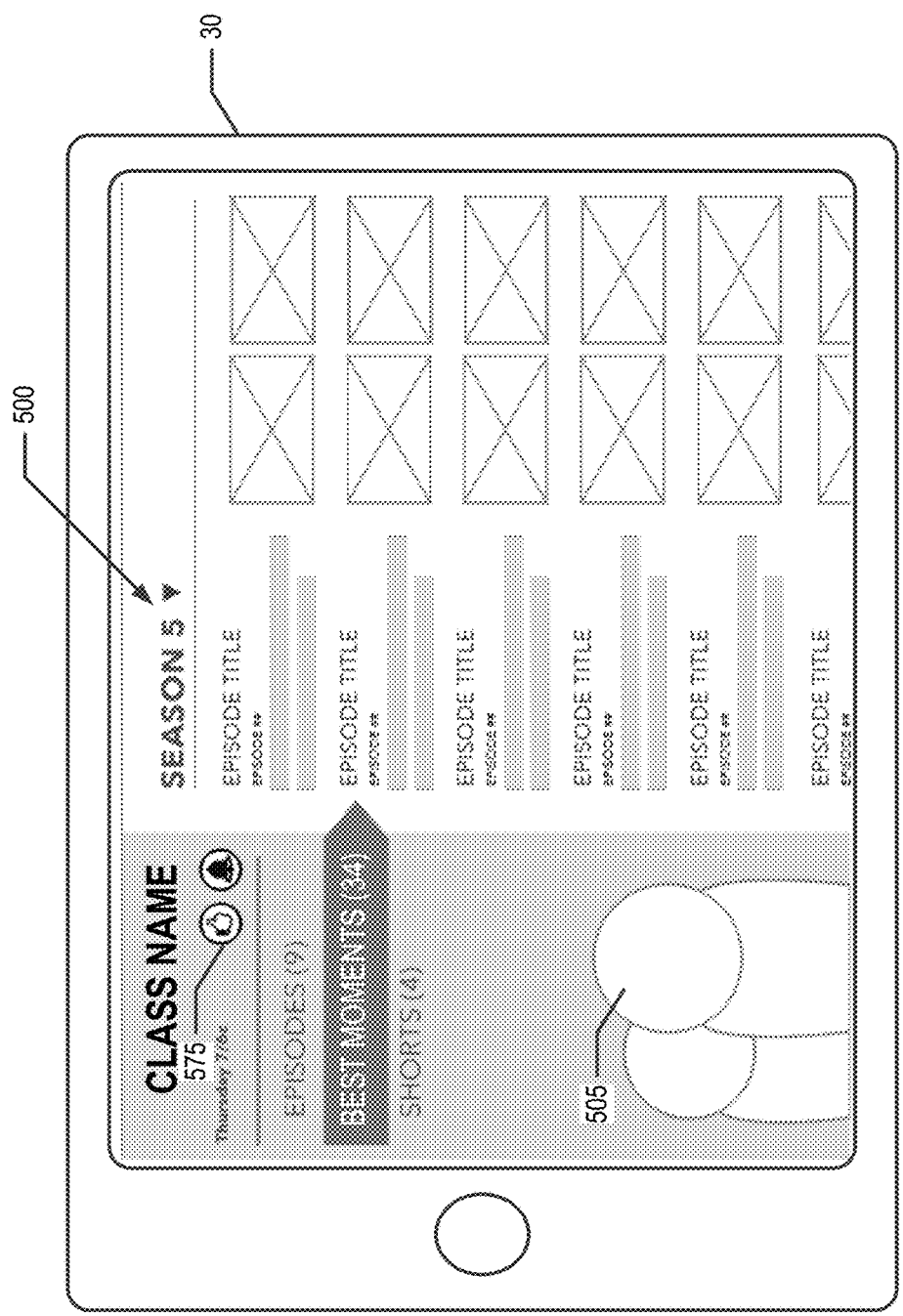
Figure 17:
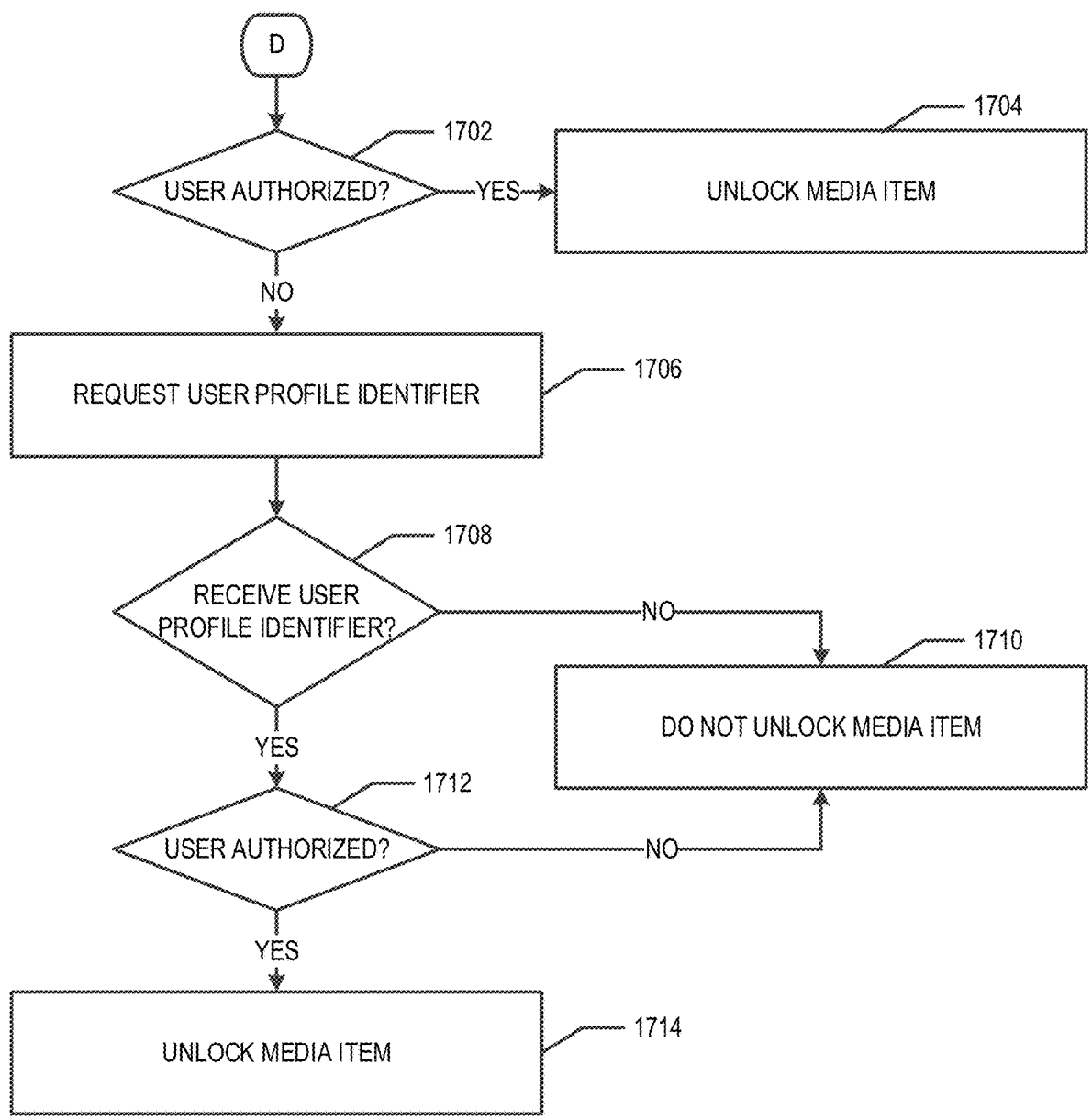

If at step/operation 1402, it is determined that input indicating the user-selected digital media item and/or selected class of media items should be removed from the personalized entertainment network has not been received, the process continues to step/operation 1408. At step/operation 1408, it is determined if view class page input has been received. For example, the provider system 200 and/or the user computing entity 30 may determine if view class page input has been received. For example, the user may select the class icon 505 displayed in the user interface 500 shown in FIG. 15 to indicate that the user would like to view the class page for the class corresponding to the class icon 505 and the digital media item corresponding to the selected upcoming tile 515. If at step/operation 1408 it is determined that view class page input has been received, the class page is provided at step/operation 1410. For example, the provider system 200 and/or the user computing entity 30 may provide the class page through the user interface 500. An example class page is shown in FIG. 16. In various embodiments, an example class page may comprise the class name/title, scheduling information/data of when media items corresponding to the class are provided by the live television broadcast, a class icon, and a listing of digital media items corresponding to the class.

Returning to FIG. 14, if at step/operation 1408 it is determined that view class page input was not received, the process continues to step/operation 1412. At step/operation 1412, it is determined if a request to view the user-selected digital media item next has been received. For example, the provider system 200 and/or the user computing entity 30 may determine if input requesting the user-selected digital media item be provided as the next media item has been received. For example, the user may select the move to the front arrow 570 shown in FIG. 15. If it is determined at step/operation 1412, that a request to the view the user-selected digital media item next has been received, the cardinality index of the user-selected digital media item is updated at step/operation 1414. For example, if the user is currently watching a digital media item assigned the cardinality index of 3 and requests to watch the digital media item previously assigned the cardinality index of 5 next, the cardinality index of the user-selected digital media item is updated to be 4. At step/operation 1416, the cardinality index assigned to other digital media items of the personalized entertainment network may be updated appropriately. Continuing with the previous example, the digital media item previously assigned the cardinality index of 4 may be updated to be assigned the cardinality index of 5. Thus, the provider system 200 and/or the user computing entity 30 may update the cardinality index of the user-selected digital media item and/or other digital media items as appropriate such that the user-selected digital media item is provided after completion of the current digital media item.

Returning to FIG. 10, if at step/operation 1020 it is determined that network management input was not received, the process continues to step/operation 1022. At step/operation 1022, it is determined if network refresh input has been received. For example, the provider system 200 and/or the user computing entity 30 may determine if network refresh input has been received. For example, the user (e.g., operating the user computing entity 30) may select the refresh your network button 517 shown in FIG. 9. If it is determined that network refresh input has been received, then, at step/operation 1024, the network is refreshed, updated, and/or rebuilt. For example, the network may be refreshed and/or rebuilt by a process similar to that described with respect to FIG. 6.

Continuing with FIG. 10, it is determined if the current digital media item is associated with and/or a portion of an unlockable media item at step/operation 1026. For example, the current digital item may be a clip taken from a locked full episode. For example, if the personalized entertainment network corresponds to a user profile of an authorized user, the full episode may be unlocked and the user may be provided with the full episode. If the personalized entertainment network does not correspond to a user profile for an authorized user, the clip of the locked full episode may be provided. If at step/operation 1026 it is determined that the digital media item is unlockable, the process may continue to step/operation 1702 shown in FIG. 17.

At step/operation 1702, it may be determined if the user is authorized to view the unlockable content. For example, the provider system 200 and/or the user computing entity 30 may determine if the user is authorized to view the unlockable content. For example, the user may have already logged into a user account/profile comprising authorizing information/data and therefore it may be determined that the user is authorized to view the unlockable media item. If at step/operation 1702 it is determined that the user is authorized, the unlockable content is unlocked at step/operation 1704.

If it is determined that the user is not authorized and/or there is not enough information/data to determine if the user is authorized, the process continues to step/operation 1706. At step/operation 1706, a user profile identifier is requested. For example, the user (e.g., operating the user computing entity 30) may be asked to provide log in credentials for a user account/profile. At step/operation 1708 it is determined if the user profile identifier is received. For example, it may be determined if user log in credentials and/or the like have been received. For example, the provider system 200 and/or the user computing entity 30 may determine if the user profile identifier has been received.

If it is determined at step/operation 1708 that the user has not entered a user profile identifier or otherwise not provided input identifying the user as an authorized user, it is determined that the user is not authorized and the digital media item is not unlocked. If it is determined at step/operation 1708 that the user has entered a user profile identifier (e.g., log in credentials for a user account/profile), it may be determined if the identified user account/profile is authorized at step/operation 1712. For example, the provider system 200 and/or the user computing entity 30 may determine if the user profile identified by the user profile identifier is authorized. For example, it may be determined if subscription information/data is stored in association with the identified user account/profile. If it is determined that identified user account/profile is not authorized, then the media item is not unlocked. However, the user may be given the opportunity to subscribe to an authorizing subscription service and/or enter subscription information/data such that the user may be authorized. If it is determined that the identified user account/profile is authorized, then the media item is unlocked at step/operation 1714. For example, the full episode may be provided rather than the clip taken from the full episode.

In various embodiments, determining if a user is authorized may further comprise determining if any parental controls, content controls, and/or other settings associated with the user profile and/or the network profile indicate that the user is not authorized to view the unlockable content. For example, the unlockable content may be rated as acceptable for young adults. However, the user profile/parental control options may indicate that the user is a seven year old. Thus, the unlockable content may not be appropriate for the user and/or the user may not be authorized to view the unlockable content.

Figure 18:
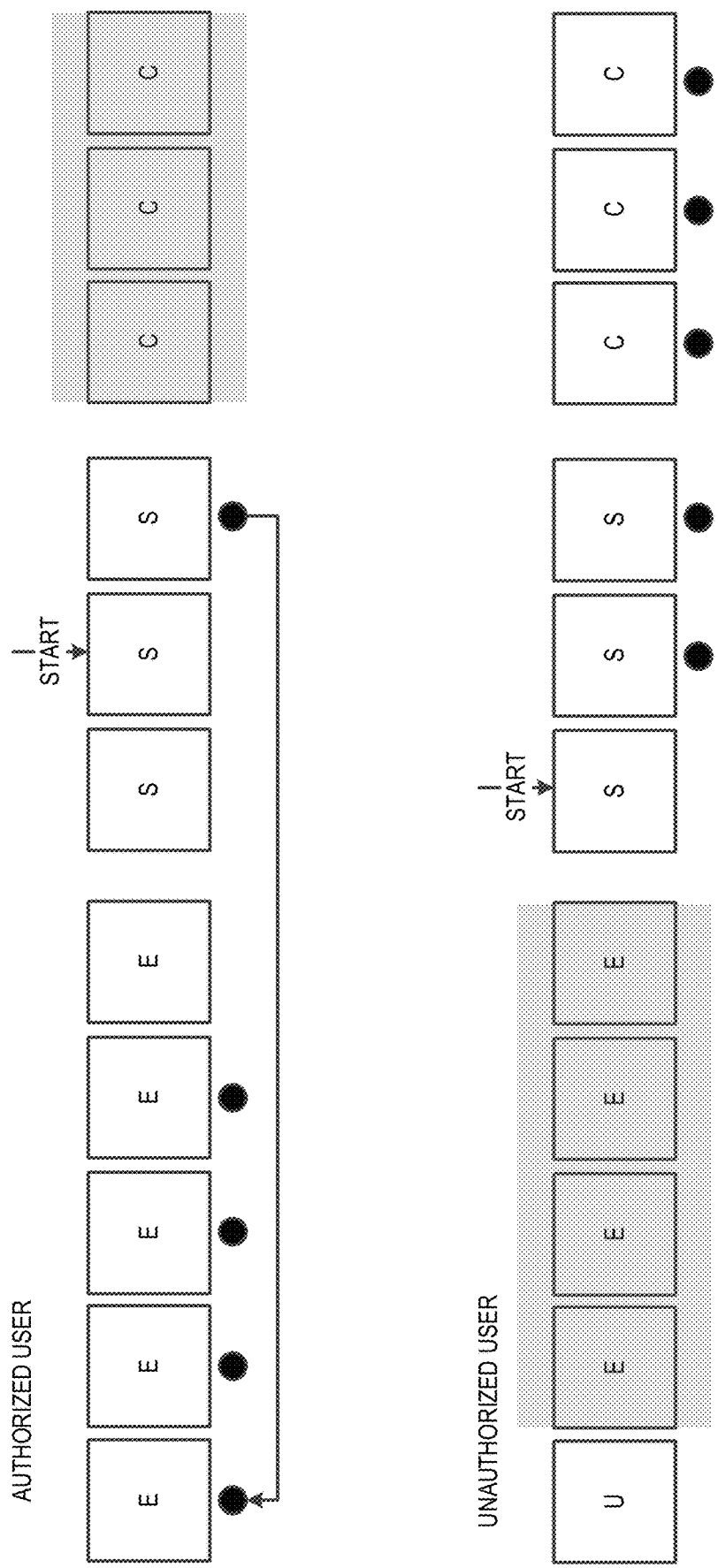

In various embodiments, when a personalized entertainment network is build, rebuilt, updated, and/or refreshed, the media items of a class that are assigned to that class's position may depend on whether the personalized entertainment network is associated with an authorized user account/profile. For example, as shown in FIG. 18, in example embodiments, a personalized entertainment network associated with an authorized user account/profile may have media items of the type short (S) and/or full episode (E) assigned to positions for the corresponding class in the personalized entertainment network and media items of the type clip (C) may be ignored. In some embodiments, the media items of type clip (C) may not be ignored if the corresponding class has a small number of episodes (e.g., less than six episodes). In an example embodiment, a personalized entertainment network associated with an unauthorized user account/profile or not associated with a user account/profile, may have media items of the type short (S), clip (C), and unlocked episode (U) assigned to positions for the corresponding class in the personalized entertainment network and media items of the type full episode (E) may be ignored. Thus, as discussed above, in example embodiments, personalized entertainment networks associated with an authorized user account/profile may be provided access to content not provided through personalized entertainment networks that are not associated with an authorized user account/profile.

Figure 19:
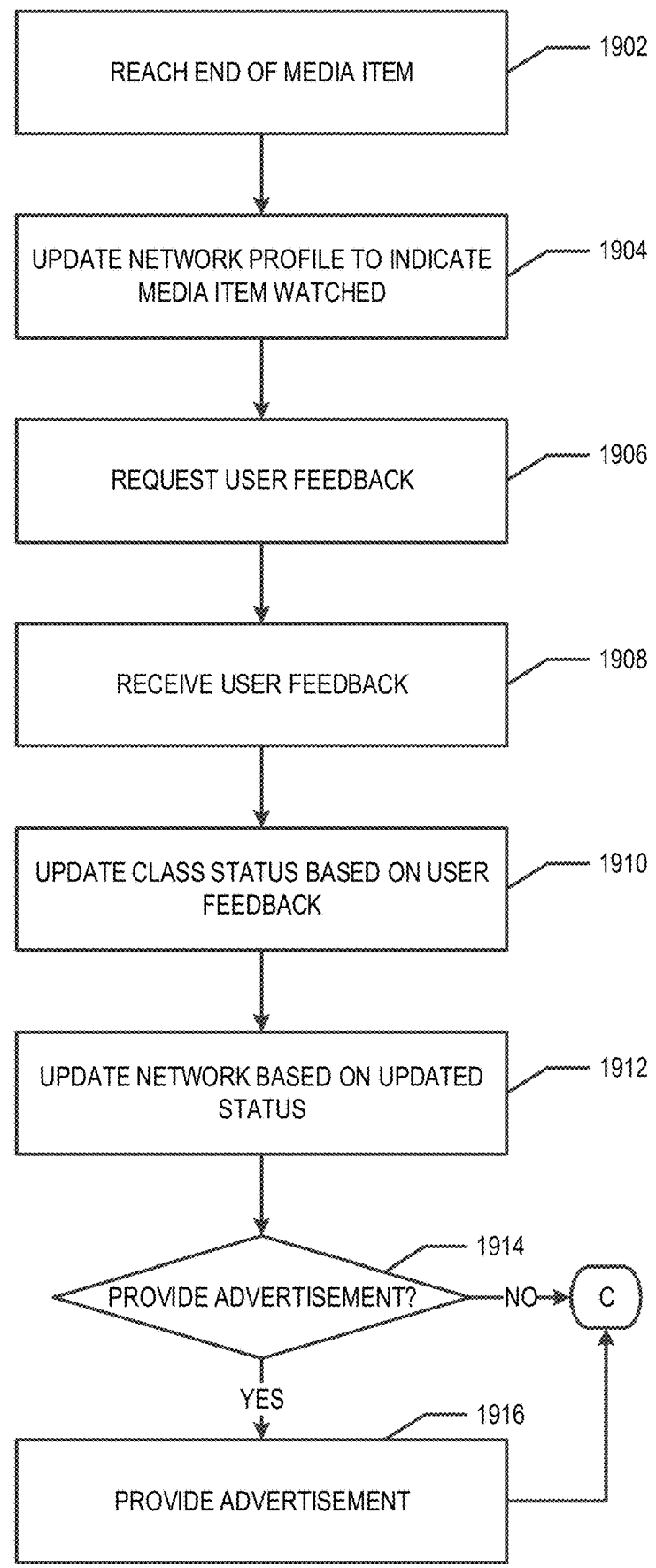

Exemplary Transition Between Media Items Provided Through a Personalized Network Regardless of whether a personalized entertainment network is associated with an authorized or unauthorized user account/profile, providing a personalized entertainment network comprises providing a digital media item to a user (e.g., through a user interface 500 provided by a user computing entity 30). When the end of the digital media item is reached, user feedback may be requested from the user, advertisements may be provided, and/or the like. FIG. 19 provides a flowchart of various processes and procedures that may be completed between providing media items of the personalized entertainment network.

Starting at step/operation 1902, the end of the digital media item is reached. For example, the end of the media item may be provided by the provider system 200 and/or the user computing entity 30. For example, the end of the media item being provided may be viewed by the user. At step/operation 1904, the network profile for the personalized entertainment network may be updated to indicate that the digital media item was provided through the personalized entertainment network. For example, the provider system 200 and/or the user computing entity 30 may updated the network profile corresponding to the personalized entertainment network to indicate that the digital media item was provided through the personalized entertainment network. In example embodiments, the recently watched tile 512 may be updated to reflect the media item that has just ended.

Figure 20:
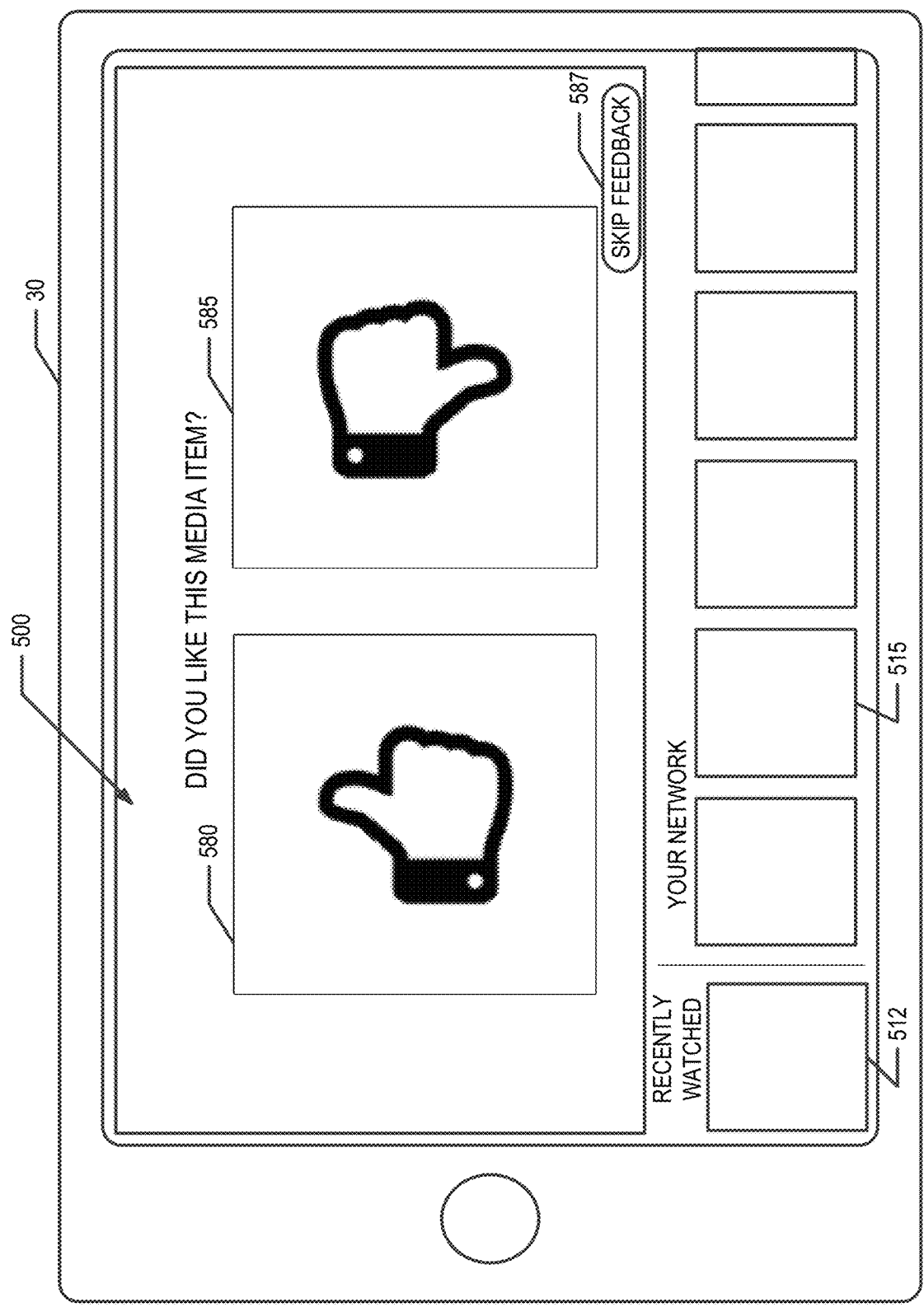

At step/operation 1906, user feedback may be requested. For example, the provider system 200 and/or the user computing entity 30 may request user feedback regarding the digital media item that was last provided and/or the corresponding class. For example, the user may be asked if he or she liked or did not like the media item he or she just watched. FIG. 20 shows an example user feedback screenshot of the user interface 500. The user interface 500 may provide the user with a like button 580 and a dislike button 585. In some embodiments, the user may be provided with a skip feedback button 587.

User feedback for the last provided media item may be received at step/operation 1908. For example, user-selection of one of the like button 580, the dislike button 585 or the skip feedback button 587 may be received. For example, the provider system 200 and/or the user computing entity 30 may receive user-selection and/or other user input providing user feedback. If the user selected the skip feedback button 587, the process may skip to step/operation 1914.

At step/operation 1910, the status associated with the class corresponding to the media item may be updated based on the user feedback. For example, the provider system 200 and/or the user computing entity 30 may update the status for the class corresponding to the media item based on the user feedback. For example, if the user feedback is positive, the class status for the class corresponding to the media item may be updated to indicate the positive feedback. Similarly, if the user feedback is negative, the class status for the class corresponding to the media item may be updated to indicate the negative feedback. An example class status evolution based on user feedback on media items corresponding to the class is described in more detail below.

Continuing with FIG. 19, at step/operation 1912, the personalized entertainment network is updated based on the updated class status. For example, the provider system 200 and/or the user computing entity 30 may update the personalized entertainment network based on the updated class status. For example, if a class status was changed from liked to disliked, media items associated with the now disliked class may be removed from positions that were originally assigned to liked classes. Similarly if a class status was changed to liked, more media items associated with the now liked class may be added to the personalized entertainment network. For example, a process similar to that described with respect to FIG. 6 may be used to update the personalized entertainment network based on the updated class status. If at step/operation 1910, the class status was not changed (e.g., the class was a liked class and remained a liked class), the personalized entertainment network my not be updated and the process may continue to step/operation 1914.

At step/operation 1914, it is determined if an advertisement should be provided. For example, the provider system 200 and/or the user computing entity 30 may determine if an advertisement should be provided. If it is determined that an advertisement should be provided, than the advertisement is provided at step/operation 1916. If it is determined that an advertisement should not be provided, the media item intro slate for the next media item is provided, as shown in FIG. 4.

Exemplary Class Status Evolution

FIG. 21 provides an example flow diagram of how the status of a class may be updated based on user feedback. Starting at step/operation 2102, user feedback for a digital media item corresponding to a neutral class (a class which is neither liked nor disliked) is received. If the user feedback indicates that the user liked the media item, the status of the corresponding class is updated to indicate that the class is liked. If the user feedback indicates that the user did not like the media item and/or disliked the media item, the status of the corresponding class is updated to indicate that the class is disliked.

At step/operation 2104, user feedback for a media item corresponding to a liked class is received. If the user feedback indicates that the user liked the media item, it is determined if the number of liked media items corresponding to the class is greater than or equal to a love threshold (e.g., greater than or equal to 5 likes). If the number of media items corresponding to the class for which positive user feedback has been received is greater than or equal to the love threshold, the class status is updated to indicate that the class is loved. In various embodiments, more positions of a personalized entertainment network may be assigned to a particular loved class than a particular liked class. For example, a loved class may be assigned to one of the first two positions when the personalized entertainment network is rebuilt or refreshed.

If at step/operation 2104, the user feedback for the media item indicates that the user did not like or disliked the media item corresponding to a liked class, the user may be asked at step/operation 2110 if the corresponding class should be removed from the catalog of liked classes. If the user provides input indicating the class should be removed from the catalog of liked classes, the status for the class is updated to disliked. If the user provides input indicating the class should not be removed from the catalog of liked classes, the status for the class remains liked.

At step/operation 2108, user feedback for a media item corresponding to a loved class is received. If the user feedback indicates that the user liked the media item, the status for the class remains loved. If the user feedback indicates that the user did not like or disliked the media item, the user may be asked at step/operation 2110 if the corresponding class should be removed from the catalog of liked classes. If the user provides input indicating the class should be removed from the catalog of liked classes, the status for the class is updated to disliked. If the user provides input indicating the class should not be removed from the catalog of liked classes, the status for the class is updated to liked.

At step/operation 2112, user feedback for a media item corresponding to a disliked class is received. If the user feedback indicates that the user liked the media item, the status for the class is updated to liked. If the user feedback indicates that the user did not like and/or disliked the media item, the status of the class may remain disliked. If more than a dead zone threshold number of media items corresponding to the class have received negative feedback from the user, the user may be asked if the class should be removed from the personalized entertainment network at step/operation 2114. For example, if a user has provided feedback indicating the user disliked five media items corresponding to the class, the user may be asked (e.g., through the user interface 500 provided by the user computing entity 30) if the class should be removed from the personalized entertainment network. If the user requests the class be removed from the personalized entertainment network, the class status is updated to dead zone and no media items corresponding to this class will be provided by the personalized entertainment network. If the user provides input indicating that the class should not be removed from the personalized entertainment network, the status of the class remains disliked. It should be understood that a variety of systems and/or flows may be used to update the status of a class based on the received user feedback. Additionally, various numbers of statuses may be used. For example, in some embodiments, a class may be associated with the status of liked, disliked, or feedback may not yet have been received for the class. In another example embodiment, a class may be associated with the status of loved, really liked, liked, ok, disliked, really disliked, hated, and/or the like.

Providing an Advertisement

Figure 22:
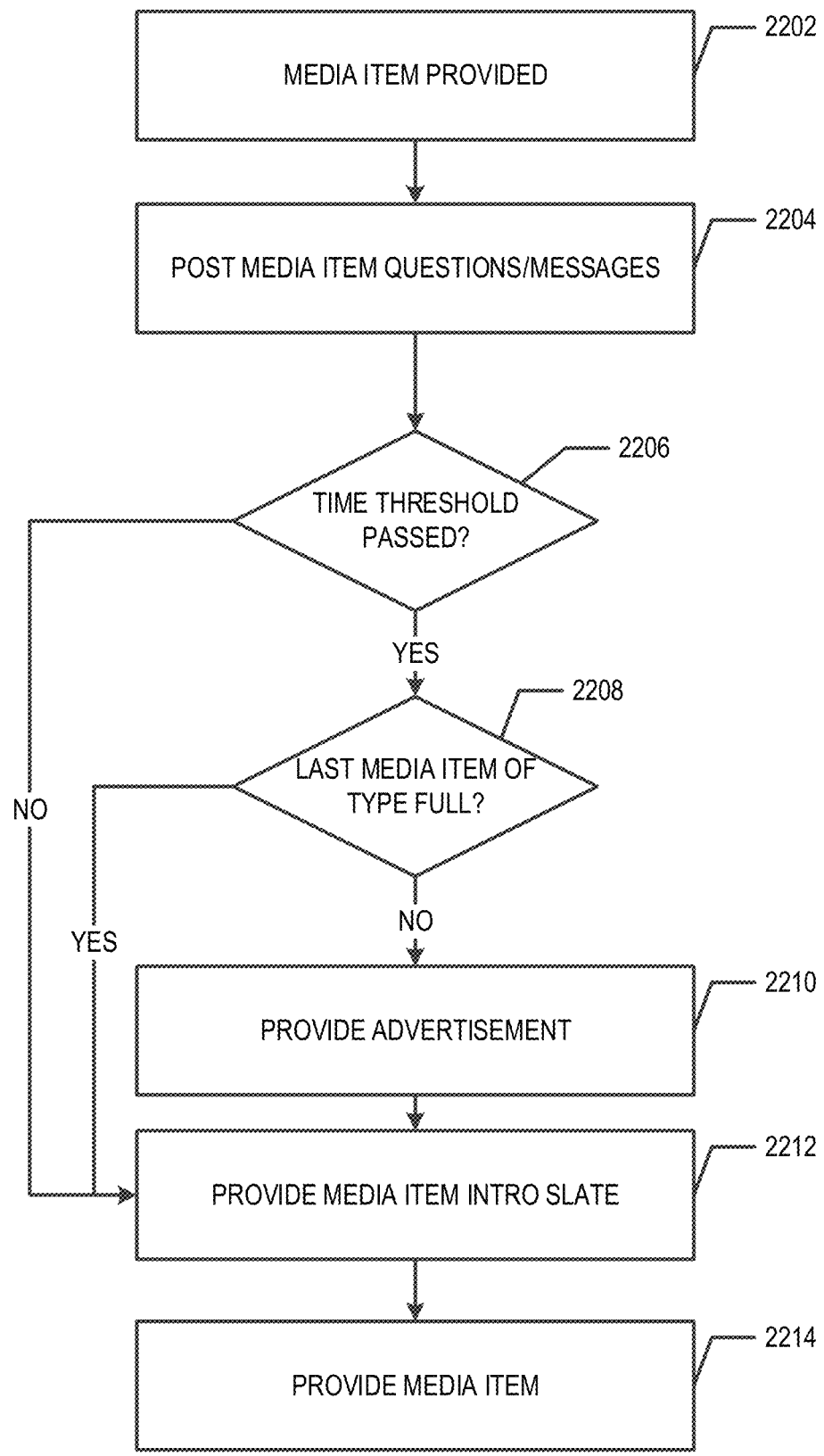

As described above, at various points in the process of providing a personalized entertainment network, it may be determined if an advertisement should be provided. FIG. 22 provides a flowchart illustrating example processes and procedures that may be used to determine if an advertisement should be provided in accordance with various embodiments of the present invention. Starting at step/operation 2202, a digital media item is provided. For example, the provider system 200 and/or the user computing entity 30 may provide a digital media item (e.g., through a user interface 500 provided by the user computing entity 30). At step/operation 2204, post media item questions and/or messages may be provided. For example, the provider system 200 and/or the user computing entity 30 may provide post media item questions and/or messages (e.g., through a user interface 500 provided by the user computing entity 30). For example, user feedback about the media item just provided may be requested.

At step/operation 2206, it may be determined if the time that has passed since the last advertisement was provided is greater than a threshold time. For example, the provider system 200 and/or the user computing entity 30 may determine if the time that has passed since the last advertisement was provided is greater than a threshold time. For example, the threshold time may be a clock time of three minutes. If the time that has elapsed since the last advertisement was provided is not greater than the threshold time, no advertisement is provided and the process continues to step/operation 2212. If the elapsed time since the last advertisement was provided is greater than the threshold time, the processes continues to step/operation 2208.

At step/operation 2208, it is determined if the last media item was a full episode. For example, the provider system 200 and/or user computing entity 30 may determine if the last media item provided was a full episode. If it is determined that the last media item was a full episode, the process continues to step/operation 2212. If it is determined that the last media item was not a full episode, the process continues to step/operation 2210.

At step/operation 2210, an advertisement is provided. For example, the provider system 200 and/or the user computing entity 30 provides an advertisement. For example, an advertisement may be provided through an advertisement server. In various embodiments, some of the video controls 525 may be disabled. For example, a user may not be able to use the time scrubber to fast forward through the advertisement. At step/operation 2212, after the advertisement is provided, a media item intro slate is provided for the upcoming media item. For example, the provider system 200 and/or the user computing entity 30 may provide a media item intro slate for the upcoming media item. At step/operation 2214, the next media item may be provided. For example, the provider system 200 and/or the user computing entity 30 may provide the next media item.

In various embodiments, an advertisement is only provided between media items. In other embodiments, an advertisement may be provided in accordance with the time threshold while the media item is being provided. In some embodiments, an advertisement may be provided during a media item if the media item is of some types (e.g., full episodes) but not provided during media items of other types (e.g., clips). In some embodiments, an advertisement free mode may be turned on. For example, in some embodiments, advertisements are not provided to authorized users. It should be understood that a variety of methods may be used for determining when to provide an advertisement through a personalized entertainment network. For example, in some embodiments, a sponsor may provide custom, "native" content (e.g., not a traditional thirty second commercial) that may be assigned to an editorial position within the personalized network. In some such embodiments, the sponsored editorial content may be visible, selectable, and/or skippable using the upcoming tiles 515, and/or the like.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a personalized entertainment network, the method comprising the steps of:
    establishing, by an application executing on a user computing device, the user computing device comprising at least one processor, a communication session with a provider system, wherein the application provides an interactive user interface for user interaction via the user computing device;
    providing, via the interactive user interface, a plurality of selectable class icons, each selectable class icon (a) graphically representing a class, and (b) being selectable via user interaction with the interactive user interface;
    responsive to receiving input of a user interaction selecting one or more of the plurality of selectable class icons, providing, by the user computing device to the provider system via the communication session, network identifying information identifying a personalized entertainment network and a class identifier for each of the one or more of the plurality of selectable class icons;
    receiving, by the user computing device via the communication session, one or more digital media items for display by the interactive user interface in accordance with an ordered set of media item identifiers, each digital media item of the one or more digital media items associated with both a particular class and a particular type, the digital media items of the particular class being linked to one another via content and the particular type indicating a format of content of the corresponding digital media item with respect to the corresponding class, wherein the particular type is a defined type of a plurality of defined types, and wherein the plurality of defined types comprises short, clip, and episode; and processing, by the user computing device and through the application, the one or more digital media items, and, responsive to the processing, directing display of the one or more media items via the interactive user interface in series based on an ordering of the ordered set of media item identifiers, wherein the provider system is configured to receive the network identifying information identifying the personalized entertainment network and a class identifier for each of the one or more of the plurality of selectable class icons, wherein (a) the network identifying information is provided through the interactive user interface and received through a communications network, (b) the personalized entertainment network corresponds to network profile information that is accessed from a profile database using the network identifying information, and (c) the network profile information comprises a class status indicator corresponding to at least one class of a plurality of classes, wherein the provider system is configured to:
  (a) for each class identifier, update the class status indicator of a corresponding class,
  (b) determine an ordered set of media item identifiers based at least in part on the network profile information for the personalized entertainment network identified by the network identifying information, each media item identifier configured to identify a digital media item, wherein the ordered set comprises a plurality of positions, the temporal length of a position of the plurality of positions being defined by the media item corresponding to the media item identifier assigned thereto,
    wherein (i) determining the ordered set of digital media items comprises assigning a class status to each position of the ordered set, and (ii) the assignment of the class statuses to each position is based at least in part on the network profile information, wherein (1) a class status indicates whether a user corresponding to the network profile information likes or dislikes a corresponding class, and (2) at least one position of the ordered set is assigned a class status corresponding to neutral or dislike,
    wherein assigning a class to each position of the ordered set is based at least in part on the class status indicator corresponding to the class and the class status corresponding to the position, and
    wherein determining the ordered set of digital media items comprises assigning a type to each position of the ordered set based at least in part on permissions associated with the network profile information,
  (c) assign a particular media item identifier to a particular position of the ordered set, wherein a particular digital media item identified by the particular media item identifier assigned to the particular position of the ordered set corresponds to (i) the class assigned to the particular position and (ii) the type assigned to the particular position, and
  (d) provide one or more digital media items for display by the interactive user interface of the user computing device.

2. A method according to claim 1, wherein the status indicates a degree to which the user likes or dislikes a class of digital media items.

3. A method according to claim 1, the method further comprising:
  after providing a first media item of a first class, receiving user input regarding the first media item, wherein (a) the user input is provided as input to the interactive user interface and (b) the user input provides feedback regarding whether a user of personalized entertainment network liked or disliked the first media item,
  wherein, responsive to receiving the user input regarding the first media item, the provider system is configured to adjust the class status associated with the first class based on the user input.

4. A method according to claim 3, wherein the provider system is further configured to update at least a portion of the ordered set of media item identifiers based at least in part on the adjusted status of the first class.

5. A method according to claim 1, wherein the network profile information comprises an indication of digital media items that have been previously provided by the personalized entertainment network.

6. A method according to claim 1, wherein each media item is associated with a type, a class, and a new content indicator.

7. A method according to claim 1, wherein each digital media item identified by a media item identifier of the ordered set of media item identifiers is selected from a catalog of digital media items and the position within the ordered set to which the corresponding media item identifier is assigned is based at least in part on at least one of (a) a new content indicator associated with the digital media item, (b) a type associated with the digital media item, or (c) whether the digital media item has previously been provided by the personalized entertainment network.

8. A method according to claim 1, wherein a first media item associated with a particular class and a new item indicator is assigned to an earlier position in the ordered set than a second media item associated with the particular class and not associated with a new item indicator.

9. An apparatus comprising a communications interface configured to communicate over one or more networks, at least one processor and at least one memory including program code, the at least one memory and the program code configured to, with the processor, cause the apparatus to at least:
  establish a communication session with a provider system, the communication session established by an application executing on the apparatus, wherein the application provides an interactive user interface for user interaction via the apparatus;
  provide, via the interactive user interface, a plurality of selectable class icons, each selectable class icon (a) graphically representing a class, and (b) being selectable via user interaction with the interactive user interface;
  responsive to receiving input of a user interaction selecting one or more of the plurality of selectable class icons, provide, to the provider system via the communication session, network identifying information identifying a personalized entertainment network and a class identifier for each of the one or more of the plurality of selectable class icons;

receive, via the communication session, one or more digital media items for display by the interactive user interface in accordance with an ordered set of media item identifiers, each digital media item of the one or more digital media items associated with both a particular class and a particular type, the digital media items of the particular class being linked to one another via content and the particular type indicating a format of content of the corresponding digital media item with respect to the corresponding class, wherein the particular type is a defined type of a plurality of defined types, and wherein the plurality of defined types comprises short, clip, and episode; and process, through the application, the one or more digital media items, and responsive to the processing, directing display of the one or more media items via the interactive user interface in series based on an ordering of the ordered set of media item identifiers, wherein the provider system is configured to receive the network identifying information identifying the personalized entertainment network and a class identifier for each of the one or more of the plurality of selectable class icons, wherein (a) the network identifying information is provided through the interactive user interface and received through a network, (b) the personalized entertainment network corresponds to network profile information that is accessed from a profile database using the network identifying information, and (c) the network profile information comprises a class status indicator corresponding to at least one class of a plurality of classes, wherein the provider system is configured to:
 (a) for each class identifier, update the class status indicator of a corresponding class,
 (b) determine an ordered set of media item identifiers based at least in part on the network profile information for the personalized network identified by the network identifying information, each media item identifier configured to identify a digital media item, wherein the ordered set comprises a plurality of positions, the temporal length of a position of the plurality of positions being defined by the media item corresponding to the media item identifier assigned thereto,
  wherein (i) determining the ordered set of digital media items comprises assigning a class status to each position of the ordered set, and (ii) the assignment of the class statuses to each position is based at least in part on the network profile information, wherein (1) a class status indicates whether a user corresponding to the network profile information likes or dislikes a corresponding class and (2) at least one position of the ordered set is assigned a class status corresponding to neutral or dislike,
  wherein assigning a class to each position of the ordered set is based at least in part on the class status indicator corresponding to the class and the class status corresponding to the position,
  wherein determining the ordered set of digital media items comprises assigning one or more types to each position of the ordered set based at least in part on permissions associated with the network profile information, and (c) assign a particular media item identifier to a particular position of the ordered set, wherein a particular digital media item identified by the particular media item identifier assigned to the particular position of the ordered set corresponds to (i) the class assigned to the particular position and (ii) one of the one or more types assigned to the particular position, and
 (d) provide one or more digital media items for display by the interactive user interface of the apparatus.

10. An apparatus according to claim 9, the at least one memory and the program code further configured to, with the processor, cause the apparatus to at least:
 after providing a first media item of a first class, receive user input regarding the first media item, wherein (a) the user input is provided as input to the interactive user interface and (b) the user input provides feedback regarding whether a user of personalized entertainment network liked or disliked the first media item,
 wherein, responsive to receiving the user input regarding the first media item, the provider system is configured to adjust the class status associated with the first class based on the user input.

11. An apparatus according to claim 10, wherein the provider system is further configured to update at least a portion of the ordered set of media item identifiers based at least in part on the adjusted class status of the first class.

12. An apparatus according to claim 9, wherein each digital media item identified by a media item identifier of the ordered set of media item identifiers is selected from a catalog of digital media items and the position within the ordered set to which the corresponding media item identifier is assigned is based at least in part on at least one of (a) a new content indicator associated with the digital media item, (b) a type associated with the digital media item, or (c) whether the digital media item has previously been provided by the personalized entertainment network.

13. An apparatus according to claim 9, wherein a first media item associated with a particular class and a new item indicator is assigned to an earlier position in the ordered set than a second media item associated with the particular class and not associated with a new item indicator.

14. A computer program product comprising at least one non-transitory computer-readable storage medium having computer-readable program code portions stored therein, the computer-readable program code portions comprising executable portions of an application, the application configured to, when executed by a processor of a user computing device, cause the user computing device to:
 provide an interactive user interface for user interaction via the user computing device;
 establish a communication session with a provider system;
 provide, via the interactive user interface, a plurality of selectable class icons, each selectable class icon (a) graphically representing a class, and (b) being selectable via user interaction with the interactive user interface;
 responsive to receiving input of a user interaction selecting one or more of the plurality of selectable class icons, provide, by the user computing device to the provider system via the communication session, network identifying information identifying a personalized entertainment network and a class identifier for each of the one or more of the plurality of selectable class icons;

receive, by the user computing device via the communication session, one or more digital media items for display by the interactive user interface in accordance with an ordered set of media item identifiers, each digital media item of the one or more digital media items associated with both a particular class and a particular type, the digital media items of the particular class being linked to one another via content and the particular type indicating a format of content of the corresponding digital media item with respect to the corresponding class, wherein the particular type is a defined type of a plurality of defined types, and wherein the plurality of defined types comprises short, clip, and episode; and process, by the user computing device and through the application, the one or more digital media items, and, responsive to the processing, direct display of the one or more media items via the interactive user interface in series based on an ordering of the ordered set of media item identifiers, wherein the provider system is configured to receive the network identifying information identifying the personalized entertainment network, wherein (a) the network identifying information is provided through the interactive user interface and received through a network, (b) the personalized entertainment network corresponds to network profile information that is accessed from a profile database using the network identifying information, and (c) the network profile information comprises a class status indicator corresponding to at least one class of a plurality of classes, wherein the provider system is configured to:
(a) for each class identifier, update the class status indicator of a corresponding class,
(b) determine an ordered set of media item identifiers based at least in part on the network profile information for the personalized entertainment network identified by the network identifying information, each media item identifier configured to identify a digital media item, wherein the ordered set comprises a plurality of positions, the temporal length of a position of the plurality of positions being defined by the media item corresponding to the media item identifier assigned thereto,
    wherein (i) determining the ordered set of digital media items comprises assigning a class status to each position of the ordered set, and (ii) the assignment of the class statuses to each position is based at least in part on the network profile information, wherein (1) a class status indicates whether a user corresponding to the network profile information likes or dislikes a corresponding class, and (2) at least one position of the ordered set is assigned a class status corresponding to neutral or dislike,
    wherein assigning a class to each position of the ordered set is based at least in part on the class status indicator corresponding to the class and the class status corresponding to the position, and
    wherein determining the ordered set of digital media items comprises assigning one or more types to each position of the ordered set based at least in part on permissions associated with the network profile information, and
(c) assign a particular media item identifier to a particular position of the ordered set, wherein a particular digital media item identified by the particular media item identifier assigned to the particular position of the ordered set corresponds to (i) the class assigned to the particular position and (ii) one of the one or more types assigned to the particular position; and
(d) provide one or more digital media items for display by the interactive user interface of the user computing device.

15. A computer program product according to claim 14, the computer-readable program code portions further comprising executable portions of the application that are configured to, when executed by the processor of the user computing device, cause the user computing device to:
after providing a first media item of a first class, receive user input regarding the first media item, wherein (a) the user input is provided as input to the interactive user interface and (b) the user input provides feedback regarding whether a user of personalized entertainment network liked or disliked the first media item,
wherein the provider system is configured to adjust the class status associated with the first class based on the user input.

16. A computer program product according to claim 15, wherein the provider system is further configured to update at least a portion of the ordered set of media item identifiers based at least in part on the adjusted class status of the first class.

17. A computer program product according to claim 14, wherein each digital media item identified by a media item identifier of the ordered set of media item identifiers is selected from a catalog of digital media items and the position within the ordered set to which the corresponding media item identifier is assigned is based at least in part on at least one of (a) a new content indicator associated with the digital media item, (b) a type associated with the digital media item, or (c) whether the digital media item has previously been provided by the personalized entertainment network.

18. A computer program product according to claim 14, wherein a first media item associated with a particular class and a new item indicator is assigned to an earlier position in the ordered set than a second media item associated with the particular class and not associated with a new item indicator.

19. A method according to claim 1, wherein each class corresponds to a particular one or more characters or a particular show.

20. A method according to claim 1, wherein the network profile information used to assign a class status to each position comprises a number of classes associated with positive class statuses.

* * * * *